United States Patent [19]
Oishi et al.

[11] Patent Number: 6,009,090
[45] Date of Patent: Dec. 28, 1999

[54] CODE MULTIPLEXING WIRELESS APPARATUS

[75] Inventors: Yasuyuki Oishi; Kazuo Nagatani; Hidenobu Fukumasa; Hajime Hamada; Yoshihiko Asano, all of Kawasaki, Japan

[73] Assignee: Fujitsu Limited, Kanagawa, Japan

[21] Appl. No.: 08/872,362

[22] Filed: Jun. 10, 1997

[30] Foreign Application Priority Data

Dec. 19, 1996 [JP] Japan .................................. 8-339393

[51] Int. Cl.⁶ .......................... H04B 7/216; H04B 15/00
[52] U.S. Cl. .......................... 370/342; 370/320; 370/335; 370/342; 375/200; 375/205; 375/206
[58] Field of Search .................................. 370/320, 335, 370/342, 441, 479, 252; 375/200, 205, 206, 298, 1, 295, 260, 261, 202

[56] References Cited

U.S. PATENT DOCUMENTS

| | | | |
|---|---|---|---|
| 4,879,726 | 11/1989 | Kobayashi et al. | 375/1 |
| 5,228,055 | 7/1993 | Uchida et al. | 375/1 |
| 5,414,728 | 5/1995 | Zehavi | 375/200 |
| 5,469,468 | 11/1995 | Schilling | 375/200 |
| 5,621,762 | 4/1997 | Miller et al. | 375/298 |
| 5,668,795 | 9/1997 | Magill et al. | 370/209 |

*Primary Examiner*—Michael Horabik
*Assistant Examiner*—Man Phan
*Attorney, Agent, or Firm*—Helfgott & Karas, P.C.

[57] ABSTRACT

A code multiplexing wireless apparatus for amplifying a code-multiplexed signal and then transmitting the amplified signal includes the following to reduce output back-off, improve the efficiency of a power amplifier and suppress broadening of the frequency spectrum: (1) a code-multiplexed signal generator for multiplying each item of transmission data by a spreading code sequence and combining spread-spectrum modulated signals to generate a code-multiplexed signal, (2) a signal-peak suppressing unit for holding the envelope of the code-multiplexed signal below a set level, and (3) a power amplifier for amplifying the code-multiplexed signal and transmitting the amplified code-multiplexed signal from an antenna.

9 Claims, 21 Drawing Sheets

CODE MULTIPLEXING WIRELESS APPARATUS

BACKGROUND OF THE INVENTION

This invention relates to a code multiplexing wireless apparatus and, more particularly, to a code multiplexing wireless apparatus for generating a code-multiplexed signal, amplifying the code-multiplexed signal and then transmitting the amplified signal.

Wireless access using CDMA (Code Division Multiple Access) has been studied and is being put to use as the next generation of digital mobile communication. CDMA is a method of multiple access using spread-spectrum communication. Specifically, transmission information of a plurality of channels or users is multiplexed by coding and transmitted over a transmission path such as a radio link.

Spread-spectrum communication is a method of modulation that is different from ordinary modulation. In spread-spectrum communication, the bandwidth of a signal after modulation is made very large in comparison with that of the narrow band in modulation. With spread-spectrum communication, two-stage modulation/demodulation is performed in the transceiver.

FIG. 20 is a structural view illustrating the operating principle of a transmitter in spread-spectrum communication. Shown in FIG. 20 are a modulator 1 such as a (phase-shift keying) PSK modulator, a spreading circuit 2, a power amplifier 3 and an antenna 4. The positions of the modulator 1 and spreading circuit 2 may be interchanged. The spreading circuit 2 includes a spreading code generator 2a for outputting a rectangular spreading code sequence (see FIG. 21) that takes on levels of ±1, such as pseudorandom noise (PN), and a multiplier 2b for multiplying digital transmission data, which has been modulated by the modulator 1, by the spreading code.

As shown in FIG. 21, the speed at which the spreading code changes (namely duration Tc of the rectangular wave) is set so as to change over at a very high rate in comparison with symbol changeover speed (one bit interval T of the PSK-modulated signal) of the narrow-band modulated signal that is modulated by the spreading code. That is, T >> Tc holds. The duration of T is referred to as the "bit duration", the duration of Tc is referred to as the "chip duration", and the reciprocals of these are referred to as the "bit rate" and "chip rate", respectively. The ratio of T to Tc (i.e. T/Tc) is referred to as the "spreading ratio".

The spectrum distribution of a spread-spectrum modulated signal exhibits the shape of a sinc function, as shown in FIG. 22. The bandwidth of a main lobe ML is equal to twice the chip rate (i.e. ML=2/Tc), and the bandwidth of a side lobe SL is 1/Tc. Since the PSK signal prior to spread-spectrum modulation is an ordinary PSK signal modulated at the bit rate 1/T, the occupied bandwidth is 2/T. Accordingly, if the occupied bandwidth of the spread-spectrum modulated signal is made the bandwidth (=2/Tc) of the main lobe, the bandwidth of the original PSK-modulated signal will be broadened T/Tc times by applying spread-spectrum modulation. The energy is diffused as a result. FIG. 23 is an explanatory view illustrating the manner in which bandwidth is enlarged by spread-spectrum modulation. Shown in FIG. 23 are a narrow bandwidth-modulated signal NM and a spread-spectrum modulated signal SM.

FIG. 24 is a structural view illustrating the operating principle of a receiver in spread-spectrum communication. Shown in FIG. 24 are an antenna 5, a wide-band bandpass filter 6 for passing only signals of necessary frequency bands and preventing radio interference from unnecessary frequency bands, a de-spreading circuit 7, a narrow-band bandpass filter 8 and a detector circuit 9 such as a PSK demodulator. The de-spreading circuit 7 has a construction identical with that of the spreading circuit 2 on the transmitting side and includes a spreading code generator 7a for outputting a rectangular spreading code sequence the same as that on the transmitting side, and a multiplier 7b for multiplying the output signal of the bandpass filter 6, by the spreading code.

The wide-band reception signal sent to the receiver is restored to the original narrow-band modulated signal via the de-spreading circuit 7 similar to the spreading circuit on the transmitting side. This is followed by the generation of a baseband waveform via the detector circuit 9, which is of the ordinary type. The reason why the narrow-band modulated signal is obtained by the de-spreading circuit 7 is as set forth below.

As shown in FIG. 25, let a(t) represent the narrow-band modulated wave on the transmitting side, c(t) the spreading code sequence (spreading code) and x(t) the transmitted waveform. These are related as follows:

$$x(t)=a(t)\cdot c(t)$$

If attenuation and the effects of noise during transmission are neglected, the transmitted waveform x(t) arrives on the receiving side intact. The spreading code used by the de-spreading circuit 7 has a waveform exactly the same as that of the spreading code used in spread-spectrum modulation on the transmitting side, as mentioned above. Accordingly, the output y(t) of the de-spreading circuit 7 is given by the following equation:

$$y(t)=x(t)\cdot c(t)=a(t)\cdot c^2(t)$$

The output signal y(t) enters the bandpass filter 8. Passing this signal through the bandpass filter is the same as integrating the signal. Thus the output of the bandpass filter is given by the following equation:

$$\int y(t)dt=a(t)\cdot \int c^2(t)dt$$

The integral on the right side of this equation is an autocorrelation value obtained when the shift in time is made zero. The autocorrelation value is unity. Accordingly, the output of the bandpass filter is a(t) and the narrow-band modulating signal is obtained.

Code division multiple access (CDMA) is a method of communication using a different spreading code for each channel or user, whereby the information transmitted on the respective channels is multiplexed by the codes. FIG. 26 is a diagram for describing the principle of CDMA on two channels. Shown in FIG. 26 are a transmitter TR in which CH1 is a first channel, CH2 a second channel and CMP a combining unit, and first and second receivers RV1, RV2, respectively.

An important point in CDMA is the "similarity" of the spreading codes used by each of the channels. When almost identical spreading codes are used by each of the channels, the channels interfere with each other severely. A so-called "correlation value" is a measure of the degree to which interference between channels occurs. The correlation value is defined by the following equation with respect to two waveforms a(t) and b(t):

$$R=\int a(t)\cdot b(t)dt \qquad \text{T: period}$$

The integration is carried out over one period T of a(t), b(t). We have R=1 when a(t) and b(t) are exactly identical waveforms and R=−1 when the waveforms are of opposite signs. On the average, looking at one period, the value of R obtained is zero when there is no relationship between the value of a(t) at a certain time and the value of b(t) at the same time.

Consider the first receiver RV1 in a situation where CDMA is performed using, as the spreading code, two waveforms $c_1(t)$ and $c_2(t)$ of such a combination that the correlation value R is zero. The signals from the first and second channels CH1 and CH2 arrive at the first receiver RV1. When the first receiver RV1 de-spreads the received signals using the code $c_1(t)$, a bandpass filter $8_1$ outputs a signal represented by the following equation:

$$\int \{a_1(t)c_1(t)c_1(t)+a_2(t)c_2(t)c_1(t)\}dt$$

The $\int\{a_2(t)c_2(t)c_1(t)\}dt$ part of this is zero because the correlation value between $c_2(t)$ and $c_1(t)$ is zero. Further, $\int c_1(t)c_1(t)dt$ is unity since this is an autocorrelation value in which the displacement in time is zero. Accordingly, the output of the low-pass filter $8_1$ of the first receiver RV1 is a1(t) and the influence of the signal making use of $c_2(t)$ as the spreading code is entirely absent. The same is true for the second receiver RV2. This will hold even if the number of simultaneously connected communication channels is increased. However, it is required that the correlation value be zero for the spreading codes of all combinations.

In actual CDMA, mutual influence cannot be measured merely by the correlation value. The reason for this is that the transmitting parties do not emit radio waves at exactly the same timing (i.e. in synchronous fashion). Accordingly, the correlation values of $c_1(t)$ and $c_2(t)$ are not merely compared; it is required that the correlation values be observed for a case where $c_1(t)$ and $c_2(t)$ are shifted arbitrarily in time.

Accordingly, it is required that a base station handling a plurality of channels or a mobile station exhibiting a high transmission rate through use of a plurality of channels have a function for generating, amplifying and transmitting code-multiplexed signals. Code multiplexing is carried out by linear voltage addition of signals spread by codes, a code-multiplexed signal obtained by voltage addition is bandwidth-limited by a chip shaping filter, the bandwidth-limited code-multiplexed signal is converted to a radio frequency and then subsequently amplified by a power amplifier before being transmitted.

FIG. 27 is a diagram showing the construction of a prior-art CDMA transmitter which code-multiplexes and transmits data on a number of channels. As shown in FIG. 27, the transmitter includes serial/parallel (S/P) converters $11_1 \sim 11_n$ for alternately distributing, one bit at a time, serial data $D_1 \sim D_n$ of first through nth channels, respectively, thereby converting the data to I-component (in-phase component) data $D_{ij}$ (j=1,2, . . . n) and Q-component (quadrature-component) data $D_{qj}$ (j=1, 2, . . . n); spreading circuits $12_1 \sim 12_n$ for multiplying the data $D_{ij}$, $D_{qj}$ by spreading codes $C_{ij}$, $C_{qj}$, respectively; a combiner $13i$ for outputting an I-component code-multiplexed signal $V_I$ by combining the I-component spread-spectrum modulated signals output by the respective spreading circuits $12_1 \sim 12_n$; a combiner $13q$ for outputting a Q-component code-multiplexed signal $V_Q$ by combining the Q-component spread-spectrum modulated signals output by the respective spreading circuits $12_1 \sim 12_n$; chip shaping filters $14i$, $14q$ for limiting the bandwidth of the code-multiplexed signals $V_I$, $V_Q$, respectively; DA converters $15i$, $15q$ for converting the digital outputs of the respective filters $14i$, $14q$ to analog signals; a quadrature modulator 16 for applying quadrature modulation to the code-multiplexed signals $V_I$, $V_Q$ of the I and Q components; and a power amplifier 17 for amplifying the output of the quadrature modulator and entering the amplified signal into an antenna, not shown.

The quadrature modulator 16 includes a carrier generator 16a for outputting a carrier wave cosωt having a prescribed frequency, a 90° phase shifter 16b for shifting the phase of the carrier wave by 90° and outputting −sinωt, a multiplier 16c for multiplying the output signal of the DA converter $15i$ by cosωt, a multiplier 16d for multiplying the output signal of the DA converter $15q$ by −sinωt, and a combiner 16e for combining the outputs of the multipliers 16c and 16d.

In CDMA, the amplitude (the outputs of the combiners $13i$, $13q$ in FIG. 27) of the code-multiplexed signals is the sum of the voltages of the number of items of information multiplexed (the number of channels), and therefore maximum power Pmax is proportional to the square of the number of multiplexed channels. More specifically, the output of each of the spreading circuits is either +1 or −1, and the maximum amplitude of the code-multiplexed signal prevailing when +1 is being output by all spreading circuits of the n channels is n. The maximum power is proportional to $n^2$. Mean power Pmean is proportional to the number n of multiplexed channels. This means that the peak factor (=Pmax/Pmean) of a code-multiplexed signal in a case where the number n of multiplexed channels is large becomes very large.

In wireless communication, the frequency band used in communication is limited. Consequently, it is necessary to suppress broadening of the frequency spectrum caused by non-linear distortion in the power amplifier (FIG. 27). More specifically, since broadening of the frequency spectrum is a cause of interference between adjacent channels, it is required that such broadening be reduced. Owing to this requirement, it is required that operation be performed in a linear region in a case where the code multiple signal is amplified by a power amplifier. A large output back-off must be employed. When output back-off is made large, however, a problem which arises is a large decrease in the power efficiency of the power amplifier. On the other hand, if the output back-off is not made sufficiently large, broadening of the spectrum is caused by non-linear distortion in the power amplifier. The problem which arises in this case is a decline in the frequency utilization efficiency of the system.

FIG. 28 shows an example of an AM-AM characteristic (input power vs. gain characteristic) of a power amplifier, and FIG. 29 shows an example of an AM-PM characteristic (input power vs. phase characteristic) of a power amplifier. The gain characteristic and phase characteristic of a power amplifier are flat and so is the input/output characteristic as long as the input power is small. There is also no phase rotation under these conditions. However, when the input power exceeds a certain level, gain starts to decline, a phase lag develops and each characteristic becomes non-linear. The output power level at which gain declines by 1 dB is referred to as the "1 db compression level", and the difference between this level and the mean output power is the output back-off OBO.

Even if the mean power level of the input signal resides in the linear area in such a non-linear amplifier, a signal having the maximum power level or a level near this level surpasses the 1 dB compression level owing to balance between the output back-off OBO and peak factor, distortion is produced and the frequency spectrum broadens. Since the peak factor is very large in a CDMA transmitter, as mentioned above, this problem is a serious one.

If the output back-off OBO is enlarged by lowering the mean power level of the input signal in such a manner that the 1 dB compression level will not be exceeded when the input signal of the maximum output level arrives, distortion does not develop and there is no broadening of the frequency spectrum. However, lowering the mean output level causes a decline in the power efficiency of the power amplifier.

Thus, in the prior art, when distortion in a power amplifier or broadening of the frequency spectrum is prevented by lowering the mean power level of the input signal (for which the output back-off OBO is large), the power efficiency of the power amplifier falls. Conversely, if the efficiency of a power amplifier is raised by raising the mean power level of the input signal (for which the output back-off OBO is small), then distortion is produced in the power amplifier and the frequency spectrum widens.

Further, as shown in FIG. 27, the DA converters $15i$, $15q$ are required in the arrangement for producing the code-multiplexed signal by digital signal processing. There is a limitation upon the number of quantization bits in such DA converters and full scale is set in such a manner that the maximum value of the code-multiplexed signal can be delivered as an output. With a CDMA transmitter, however, the peak factor of the code-multiplexed signal is very large. As a result, the number of effective bits with regard to a signal in the vicinity of mean power having a high frequency of occurrence decreases and quantization noise increases. The deterioration due to quantization has a deleterious effect upon the noise floor of the spectrum frequency and is a cause of interference between adjacent channels.

SUMMARY OF THE INVENTION

Accordingly, an object of the present invention is to provide a code multiplexing wireless apparatus in which power amplifier efficiency can be improved by reducing the output back-off OBO, and in which it is possible to suppress broadening of the frequency spectrum.

Another object of the present invention is to provide a code multiplexing wireless apparatus in which the number of effective bits for a signal in the vicinity of mean power having a high frequency of occurrence can be enlarged.

According to the present invention, the foregoing objects are attained by providing a code multiplexing wireless apparatus for generating a code-multiplexed signal, amplifying the code-multiplexed signal and transmitting the amplified signal, comprising a code-multiplexed signal generator for multiplying each item of transmission data by a spreading code sequence and combining spread-spectrum modulated signals to generate a code-multiplexed signal, a signal-peak suppressing unit for holding an envelope of the code-multiplexed signal below a set level, and a power amplifier for amplifying the code-multiplexed signal and transmitting the amplified code-multiplexed signal from an antenna.

Other features and advantages of the present invention will be apparent from the following description taken in conjunction with the accompanying drawings.

DESCRIPTION OF THE PREFERRED EMBODIMENTS (A) Overview of the invention

Figure 1:
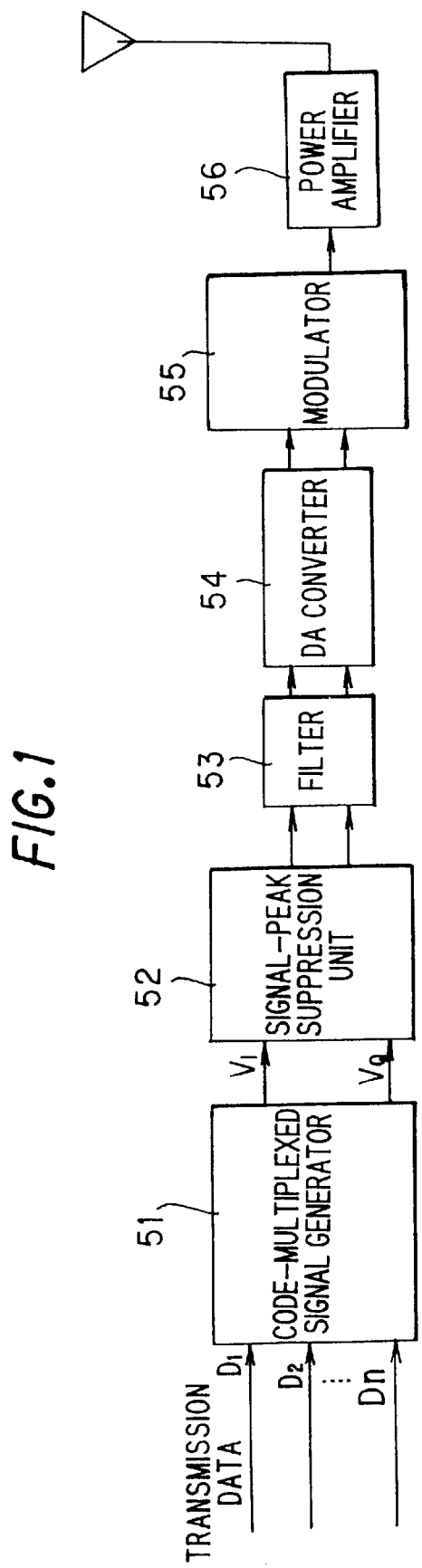
FIG. 1 is a block diagram illustrating the principle of the present invention.

FIG. 1 is a diagram useful in describing an overview of the present invention.

A code-multiplexed signal generator 51 multiplies items of transmission data $D_1 \sim D_n$ by respective spreading codes to thereby spread-spectrum modulate the data, and combines the spread-spectrum modulated signals to generate code-multiplexed signals of in-phase and quadrature components. A signal-peak suppression unit 52 holds the envelopes of the code-multiplexed signals below a set level. A filter 53 limits the band of the code-multiplexed signals. A DA converting unit 54 converts the digital output of the filter to an analog signal. A modulator, e.g. a quadrature phase-shift keying (QPSK) modulator 55, modulates the output of the DA converting unit 54. A power amplifier 56 amplifies the output of the modulator 55 and then transmits the amplified signal from an antenna.

The code-multiplexed signal generator 51 includes converting means for alternately distributing, one bit at a time, each item of transmission data to thereby convert the data to in-phase component data and quadrature component data, spreading circuits for multiplying the data of these I and Q components by spreading codes to thereby spread-spectrum modulate the data, and combiners for combining the I-component spread-spectrum modulated signals output by the spreading circuits and combining the Q-component spread-spectrum modulated signals output by the spreading circuits, thereby outputting code-multiplexed signals $V_I$ and $V_Q$ of the I and Q components, respectively.

The signal-peak suppression unit 52 detects the envelope of a resultant code-multiplexed signal obtained by combining the code-multiplexed signals $V_I$ and $V_Q$ of the I and Q components, compares the envelope value with a set level and, if the envelope value is greater than the set level, obtains a damping factor that will make the envelope value equal to the set level and multiplies the code-multiplexed signals $V_I$, $V_Q$ by this damping factor, thereby suppressing the peak value. Alternatively, the signal-peak suppression unit 52 stores a function (gain) in which the envelope value of the code-multiplexed signal is a variable, detects the envelope value of the code-multiplexed signal and multiplies the function value (gain) conforming to this envelope value by the code-multiplexed signal components $V_I$, $V_Q$, thereby suppressing the peak value. Alternatively, the signal-peak suppression unit 52 generates a code conforming to the difference between the envelope value and a set level and adds this code to or subtracts it from the code-multiplexed signal components $V_I$, $V_Q$ to suppress the peak value of the code-multiplexed signal.

The peak factor can be reduced by suppressing the peak value of the code-multiplexed signal. As a result, it can be so arranged that the maximum power level of the output signal will not surpass the 1 dB compression level even if the output back-off OBO is small. More specifically, the efficiency of the power amplifier can be improved and it is possible to prevent the occurrence of distortion and broadening of the frequency spectrum.

Further, the maximum output amplitude of the filter 53 is made the full scale of the DA converting unit 54. Since the peak factor is small as a virtue of this arrangement, it is possible to enlarge the number of effective bits in regard to a frequently occurring signal in the vicinity of mean power, the noise floor of the output spectrum can be reduced and it is possible to reduce the required number of bits of the DA converting unit.

(B) First embodiment

Figure 2:
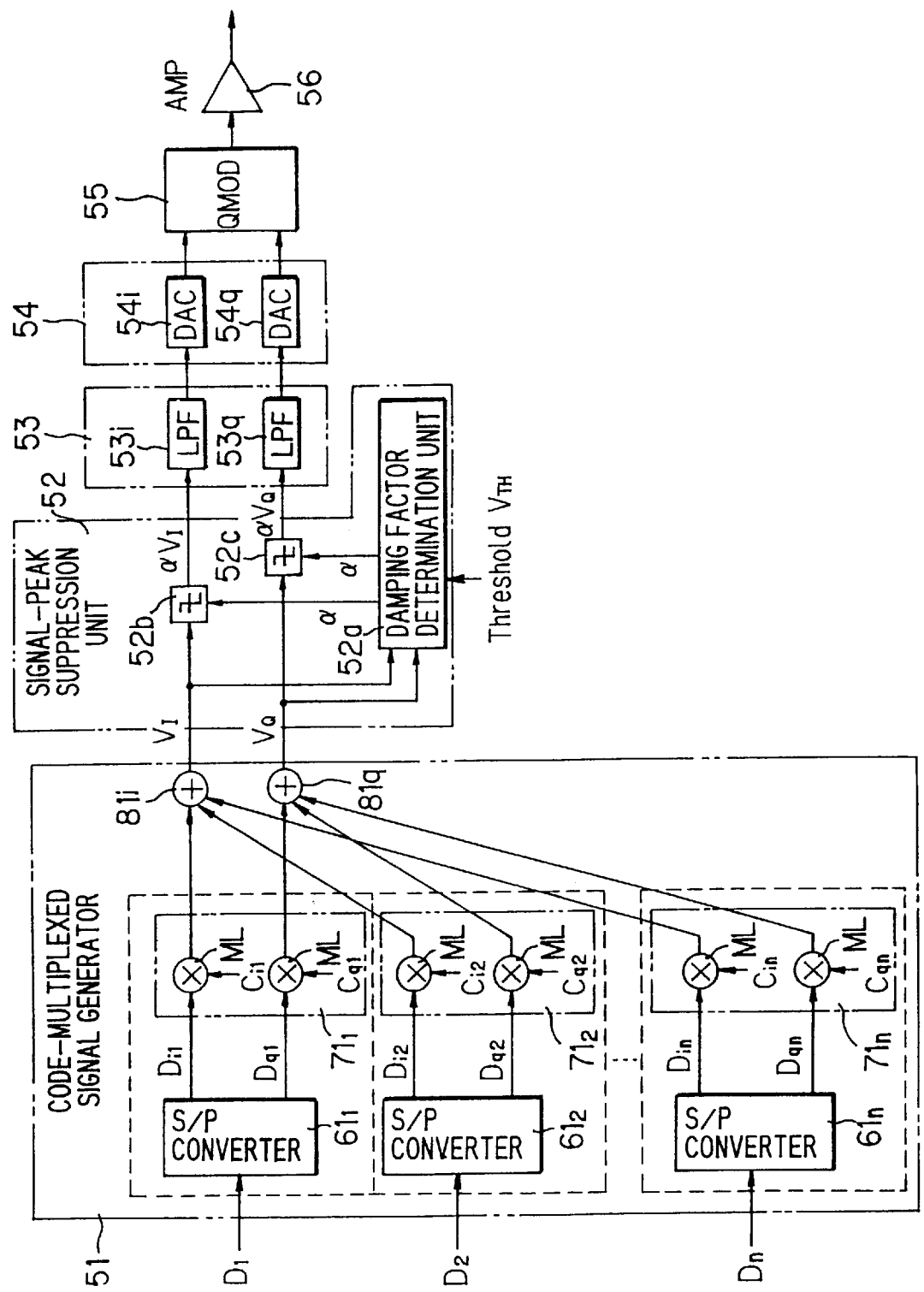
FIG. 2 is a diagram showing the construction of a first embodiment of the present invention.

FIG. 2 is a diagram showing the construction of a code multiplexing transmitter according a first embodiment of the invention. This is an embodiment for a case where the present invention is applied to QPSK spread-spectrum modulation.

As shown in FIG. 2, the transmitter includes the code-multiplexed signal generator 51 which multiplies transmission data $D_1 \sim D_n$ of respective channels by the spreading codes and combines the spread-spectrum modulated signals to generate the code-multiplexed signal components $V_I$, $V_Q$; the signal-peak suppression unit 52 which holds the envelopes of the code-multiplexed signals below a set level; the filter 53 which limits the band of the code-multiplexed signals; the DA converting unit 54 which converts the digital output of the filter to an analog signal; the quadrature modulator (QMOD) 55 which modulates the output of the DA converting unit 54; and the power amplifier 56 which amplifies the output of the quadrature modulator 55 and then transmits the amplified signal from an antenna.

The code-multiplexed signal generator 51 has serial/parallel (S/P) converters $61_1 \sim 61_n$ and spreading circuits $71_1 \sim 71_n$, which are provided for respective ones of the channels, and combiners 81*i*, 81*q* for combining the spread-spectrum modulated signals of the I and Q components, respectively, output by each of the spreading circuits $71_1 \sim 71_n$. The S/P converters $61_1 \sim 61_n$ alternately distribute, one bit at a time, the transmission data $D_1 \sim D_n$, respectively, thereby converting the data to I-component (in-phase component) data $D_{ij}$ (j=1,2, . . . n) and Q-component (quadrature-component) data $D_{qj}$ (j=1, 2, . . . n), and input the resulting data to the corresponding spreading circuits $71_1 \sim 71_n$. The spreading circuits $71_1 \sim 71_n$ each have a spreading code generator (not shown) for generating spreading codes $C_{ij}$, $C_{qj}$ (j=1, 2, . . . n), and a multiplier ML for multiplying the data $D_{ij}$, $D_{qj}$ by the codes $C_{ij}$, $C_{qj}$, respectively, and outputting spread-spectrum modulated signals. The combiner 81*i* sums the I-component spread-spectrum modulated signals $D_{ij} \cdot C_{ij}$ (j=1, 2 . . . n) output by the respective spreading circuits $71_1 \sim 71_n$ and outputs the I-component code-multiplexed signal $V_I [= \Sigma D_{ij} \cdot C_{ij}$ (j=1 , 2 . . . n)]. The combiner 81*q* sums the Q-component spread-spectrum modulated signals $D_{qj} \cdot C_{qj}$ (j=1, 2 . . . n) output by the respective spreading circuits $71_1 \sim 71_n$ and outputs the Q-component code-multiplexed signal $V_Q [= \Sigma D_{qj} \cdot C_{qj}$ (j=1, 2 . . . n)].

Figure 3:
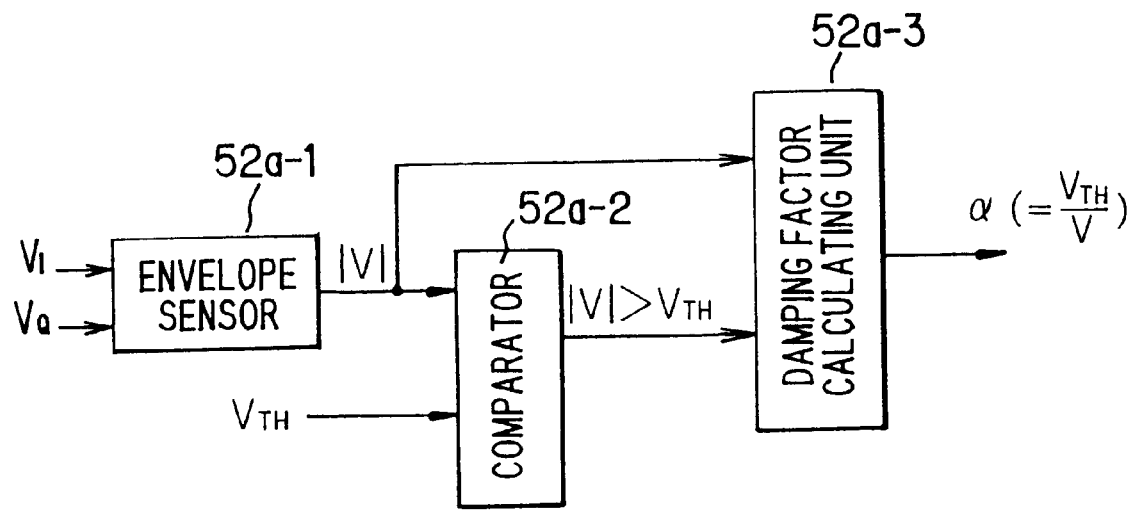
FIG. 3 is a block diagram showing the construction of a damping factor determining unit.

The signal-peak suppression unit 52 includes a damping factor determination unit 52*a* for determining a damping factor α which holds the envelope of the code-multiplexed signal below a set level, and multipliers (e.g. attenuators) 52*b*, 52*c* for multiplying the code-multiplexed signal $V_I$ of the I component and the code-multiplexed signal $V_Q$ of the Q component by the damping factor α. As shown in FIG. 3, the damping factor determination unit 52*a* includes an envelope sensor 52*a*-1 for sensing the envelope of a code-multiplexed signal obtained by combining the code-multiplexed signal $V_I$ of the I component and the code-multiplexed signal $V_Q$ of the Q component, a comparator 52*a*-2 for comparing the magnitudes of an envelope value |V| and a set level $V_{TH}$, and a damping factor calculating unit 52*a*-3 which, in a case where the envelope value |V| is greater than the set level $V_{TH}$, uses the following equation to calculate the damping factor a that makes the envelope value equal the set level:

$$\alpha = V_{TH}/|V| \qquad (1)$$

It should be noted that the relation α=1 holds in a case where the envelope value is equal to or less than the set level $V_{TH}$.

Figure 4:
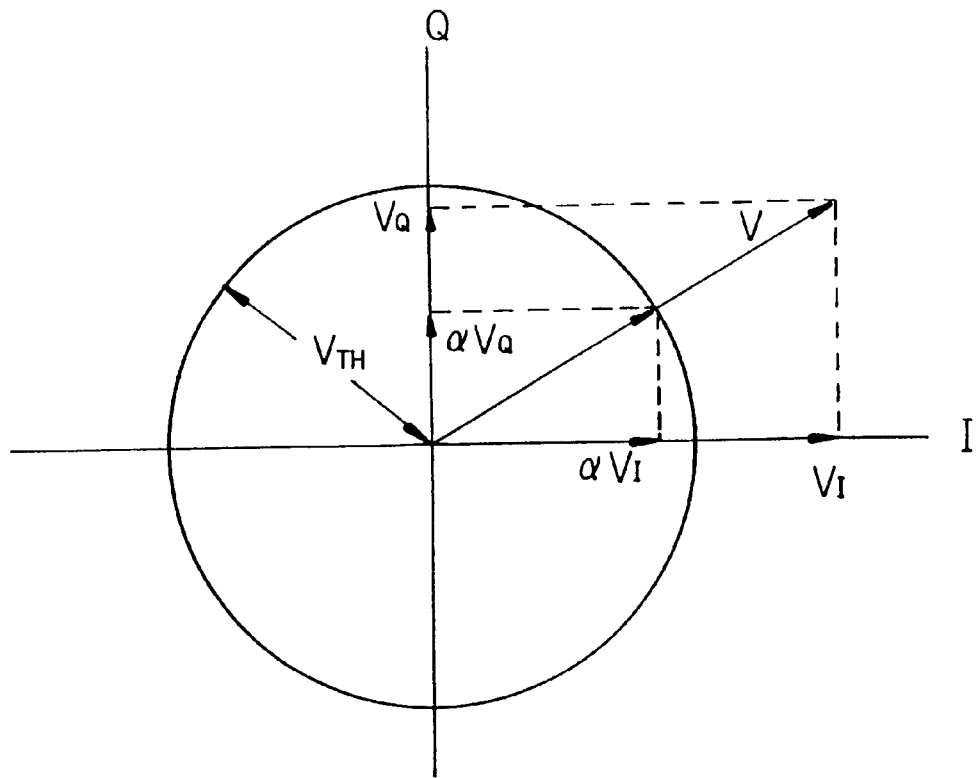
FIG. 4 is a diagram useful in describing the determination of damping factor.

Consider an I-Q rectangular coordinate system as shown in FIG. 4. The envelope V of the code-multiplexed signal is a vector in which the component along the I axis is $V_I$ and the component along the Q axis is $V_Q$. Since $V_I$, $V_Q$ are each obtained by summing n-number of spread-spectrum modulated signals (the instantaneous values of which are +1 or −1), these take on values of −n to +n and the envelope V varies, becoming larger and smaller than the set level $V_{TH}$.

The envelope sensor 52a-1 calculates the envelope value |V| in accordance with $$|V| = \sqrt{(V_I^2 + V_Q^2)} \quad \text{or} \quad |V|^2 = V_I^2 + V_Q^2$$

and the comparator 52a-2 compares the magnitudes of the envelope value |V| and the set level $V_{TH}$ and enters the result of the comparison into the damping factor calculating unit 52a-3. If the envelope value |V| is equal to or less than the set level $V_{TH}$, the damping factor calculating unit 52a-3 outputs α=1 as the damping factor since peak suppression is unnecessary. If the envelope value |V| is greater than the set level $V_{TH}$, the damping factor calculating unit 52a-3 calculates the damping factor a in accordance with Equation (1) and inputs this value to the multipliers 52b, 52c (FIG. 2). The multipliers 52b, 52c multiply the I-axis component $V_I$ and Q-axis component $V_Q$, respectively, by the damping factor α and output the products $\alpha V_I$, $\alpha V_Q$, respectively. If $|V|>V_{TH}$ holds, the envelope becomes equal (is clipped) to the set level $V_{TH}$, as shown in FIG. 4, so that the peak of the code-multiplexed signal is suppressed. If $V \leq V_{TH}$ holds, the I-axis component $V_I$ and Q-axis component $V_Q$ are not suppressed and are output as is.

Figure 5A:
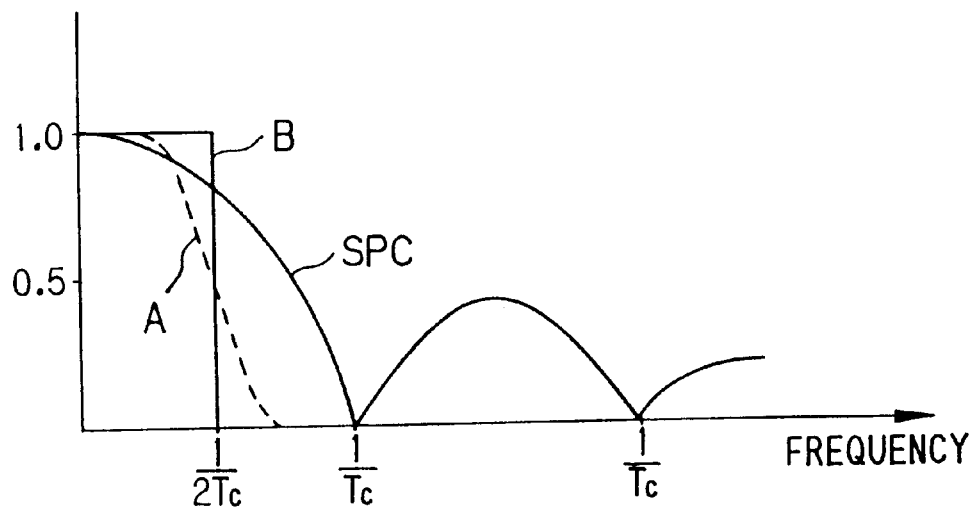
FIGS. 5A, 5B and 5C are diagrams for describing the characteristics of a chip shaping filter.
Figure 5B:
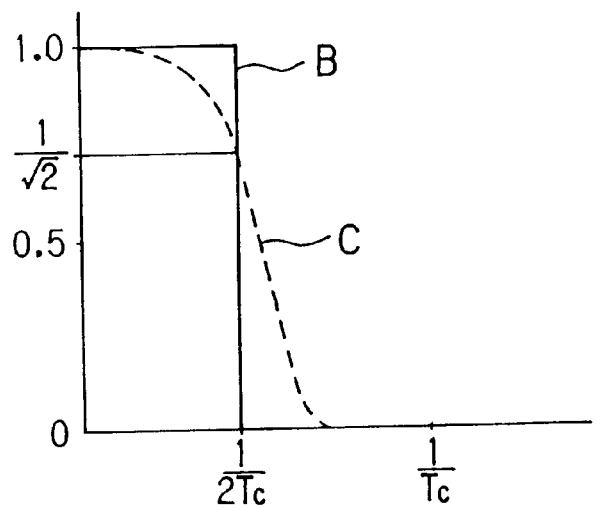
Figure 5C:
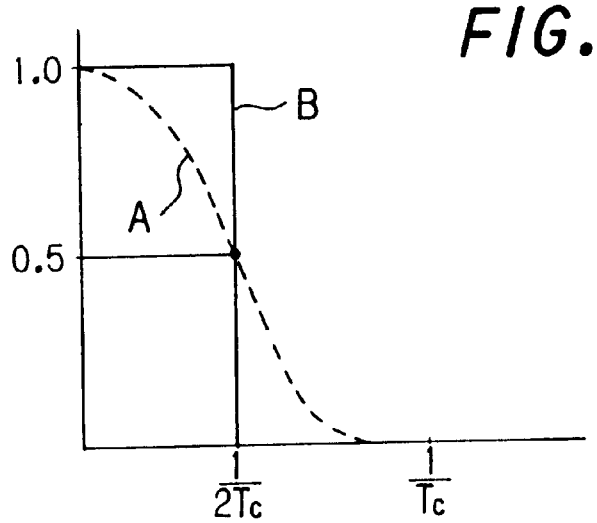

The filter 53 has chip shaping filters 53i, 53q each comprising a digital filter for limiting the bands of the I and Q components, respectively, of the code-multiplexed signal. The spectrum distribution of the code-multiplexed signal has the shape of a sinc curve, as indicated by the solid line SPC in FIG. 5A, and a band in excess of 1/Tc is unnecessary. Accordingly, band limiting is performed by a filter having a frequency characteristic indicated by the dashed line A. In FIG. 5A, the character B represents the frequency characteristic of an ideal filter. In wireless communication, it is required to arrange it so that the composite characteristic of the filters with which the transmitter and receiver are provided becomes as indicated by the dashed line A in FIG. 5A. Accordingly, the method generally adopted is to set a root roll-off characteristic C shown in FIG. 5B in each of the chip shaping filters 53i, 53q and allocate the characteristic in such a manner that the composite filter characteristic of the transceiver becomes the characteristic A shown in FIG. 5A or FIG. 5C.

The DA converting unit 54 has DA converters 54i, 54q for I and Q components, respectively, of the code-multiplexed signal for converting the outputs of the chip shaping filters to analog signals and entering the analog signals into the quadrature modulator 55. Full scale of the DA converters 54i, 54q is set to be the maximum amplitude value of the chip shaping filters 53i, 53q.

Figure 27:
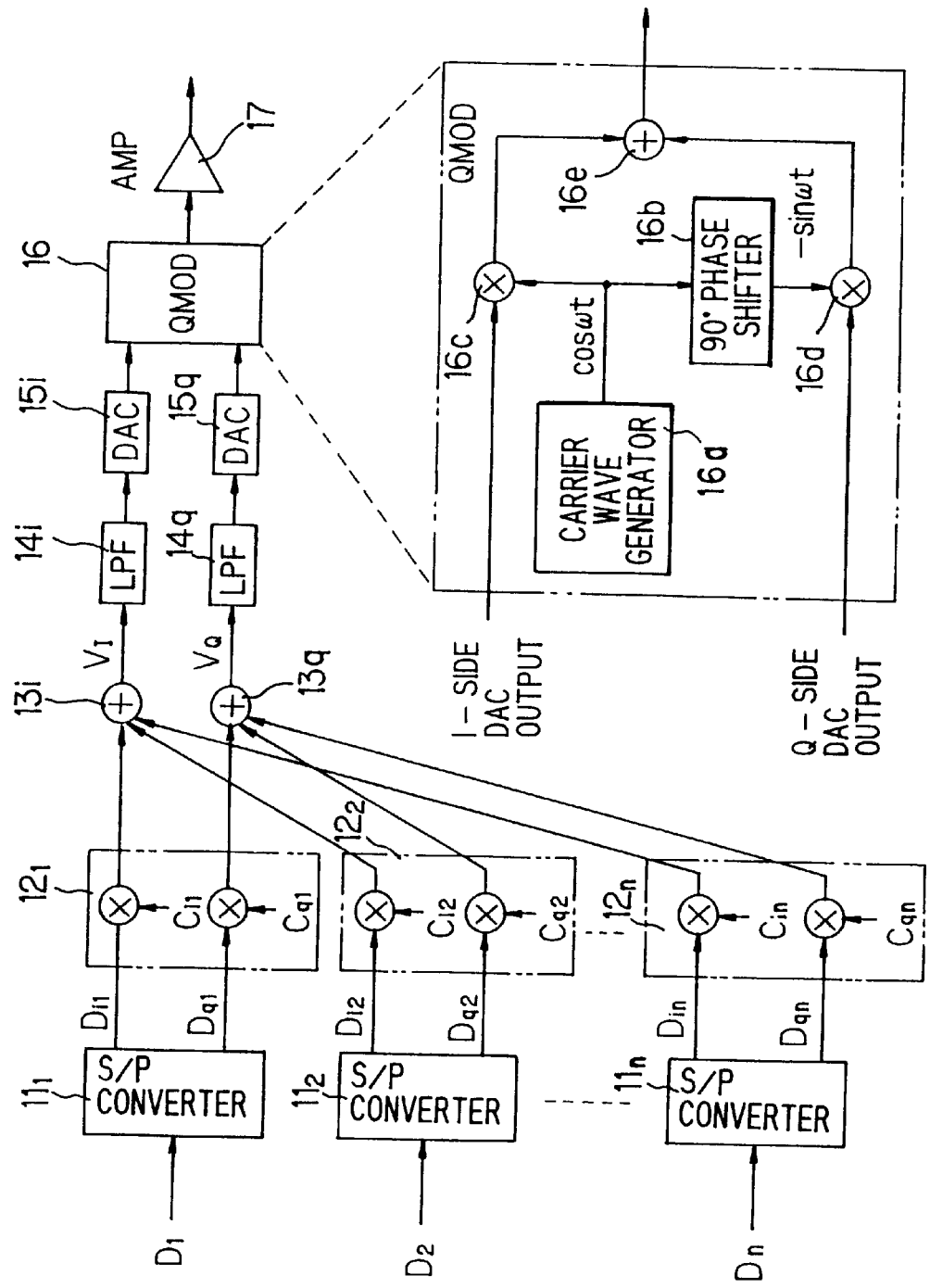
FIG. 27 is a diagram showing the construction of a CDMA transmitter according to the prior art.
Figure 28:
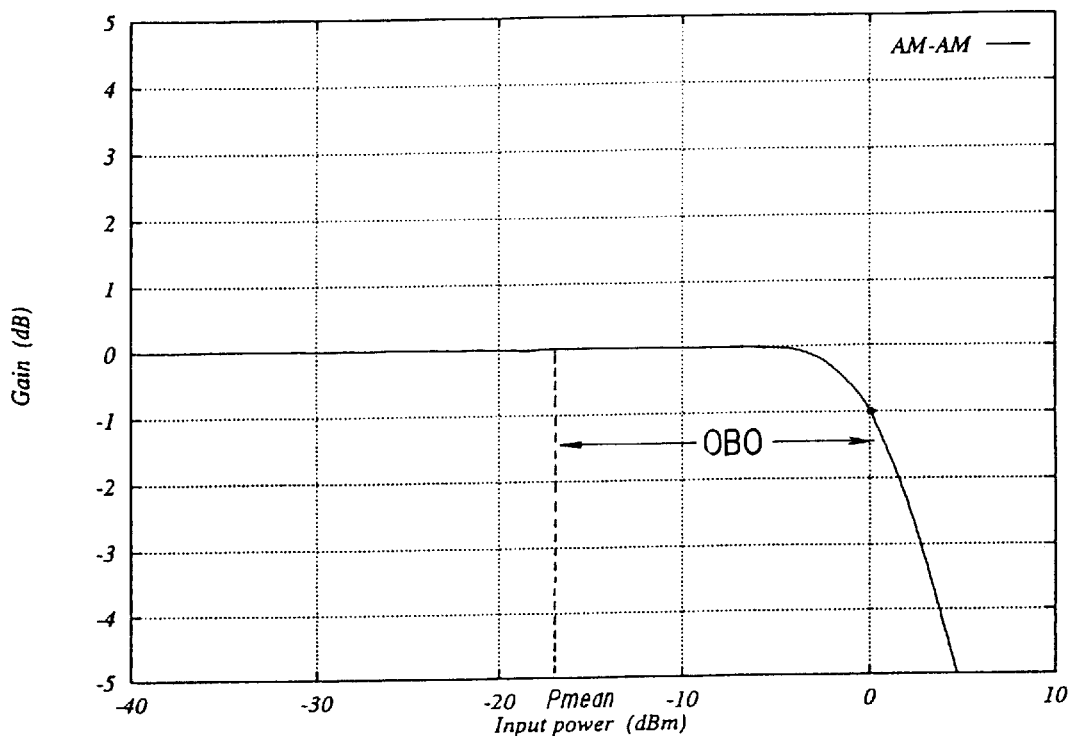
FIG. 28 is characteristic diagram showing the AM-AM characteristic of an amplifier.
Figure 29:
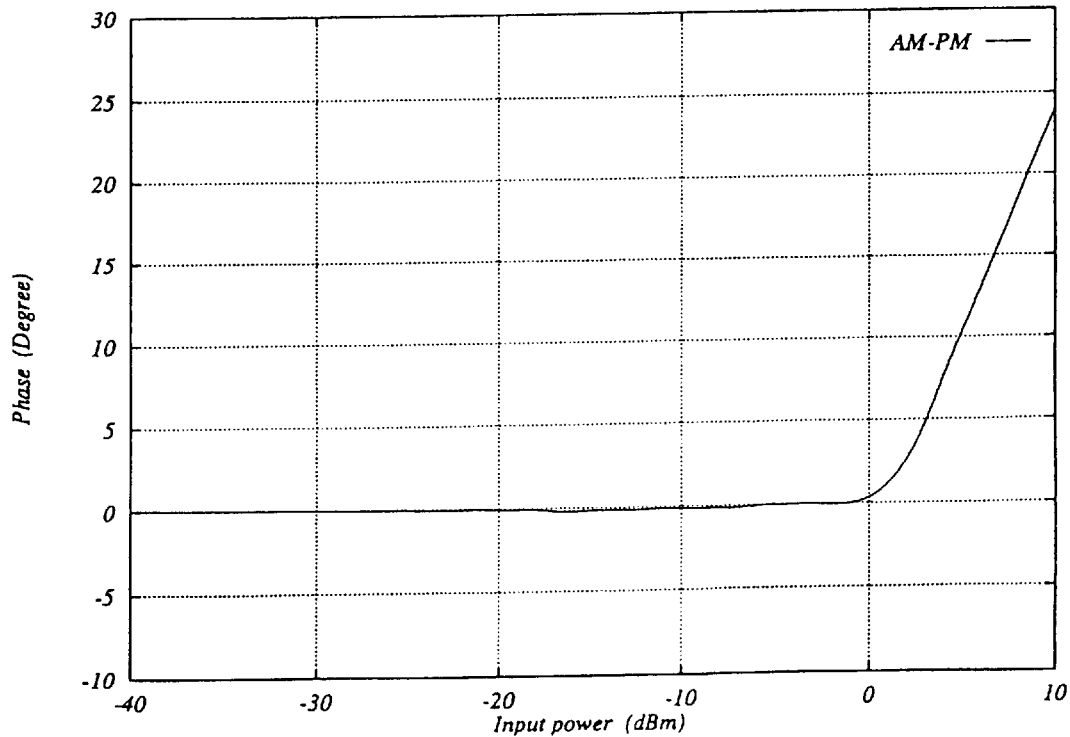
FIG. 29 is characteristic diagram showing the AM-PM characteristic of the amplifier.

The quadrature modulator 55 has a construction identical with that shown in FIG. 27. The power amplifier 56 is a non-linear amplifier and has characteristics shown in FIGS. 28 and 29, by way of example.

By suppressing the peak value of the code-multiplexed signal in the signal-peak suppression unit 52 in the manner described above, the peak factor can be made small. As a result, it can be so arranged that the maximum power level of the signal will not exceed the 1 dB compression level even if the output back-off OBO is small. In other words, it can be so arranged that even if the mean power level of the input signal is enlarged, the maximum power level of the output signal will not exceed the 1 dB compression level. This makes it possible to raise the efficiency of the power amplifier and to prevent the occurrence of distortion and broadening of the frequency spectrum. Further, even if maximum output amplitude of the chip shaping filters 53i, 53q is adopted as full scale of the DA converters 54i, 54q, the peak factor is small. As a result, the number of effective bits of a frequently occurring signal in the vicinity of mean power can be enlarged, the noise floor of the output spectrum can be lowered and the number of required bits of the DA converters can be reduced.

(C) Second embodiment

Figure 6:
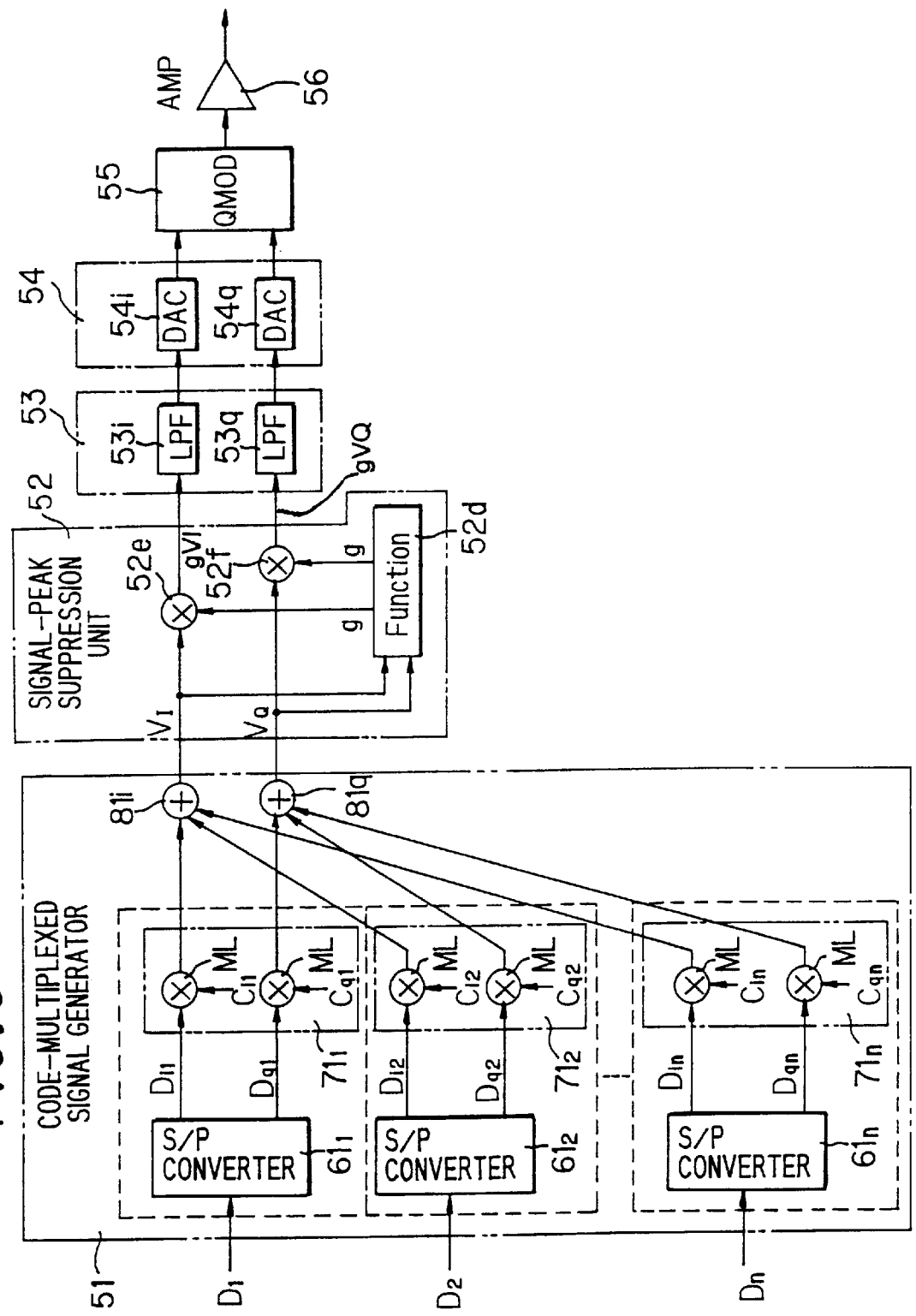
FIG. 6 is a diagram showing the construction of a second embodiment of the invention.

FIG. 6 is a diagram showing the construction of a code multiplexing transmitter according a second embodiment of the invention. Elements identical with those of the first embodiment shown in FIG. 2 are designated by like reference characters. This arrangement differs from that of the first embodiment of FIG. 2 in the construction of the signal-peak suppression unit 52.

The signal-peak suppression unit 52 according to the second embodiment has a function generator 52d for generating a function value (e.g. gain g) conforming to the envelope value |V| of the code-multiplexed signal, and multipliers 52e, 52f for multiplying the code-multiplexed signal $V_I$ of the I component and the code-multiplexed signal $V_Q$ of the Q component by the gain g. The function generator 52d generates a gain function indicated by the solid line in FIG. 7. This gain function is determined in such a manner that when the envelope value |V| is greater than the set level $V_{TH}$, the product g~|V|, which is obtained by multiplying envelope value |V| by the gain g obtained from the above-mentioned function, will be equal to or less than the set value $V_{TH}$.

Figure 7:
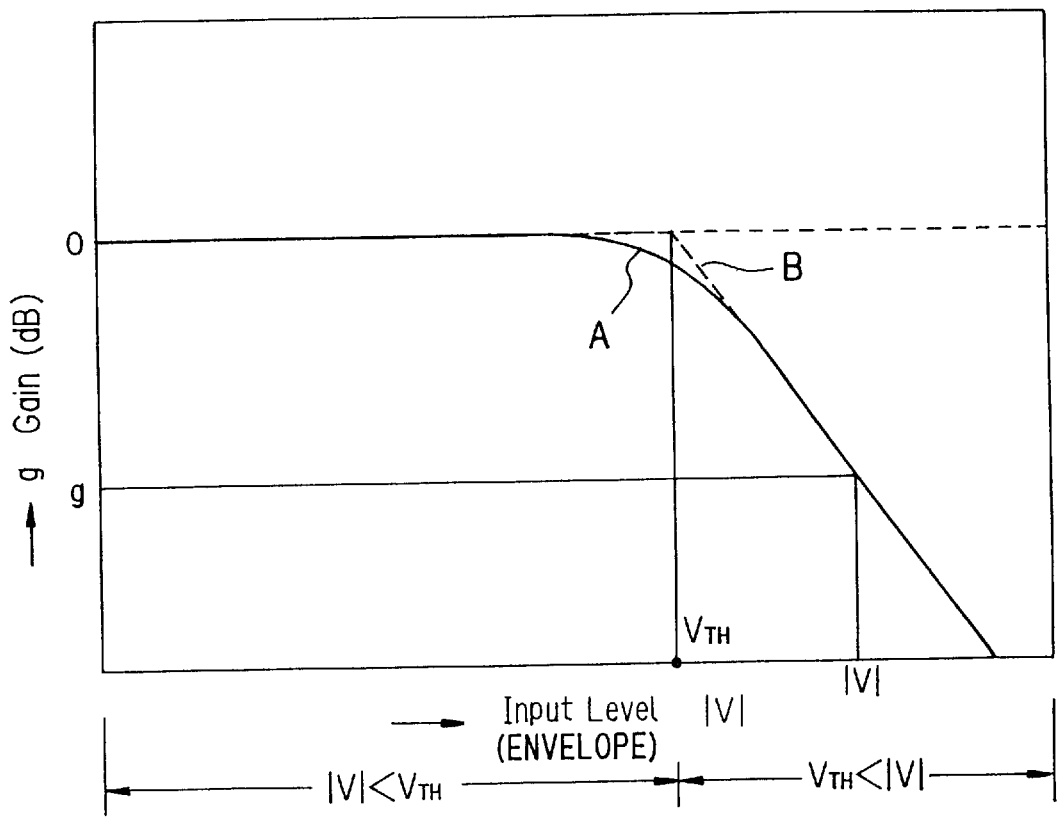
FIG. 7 is a diagram for describing a gain function.
Figure 8:
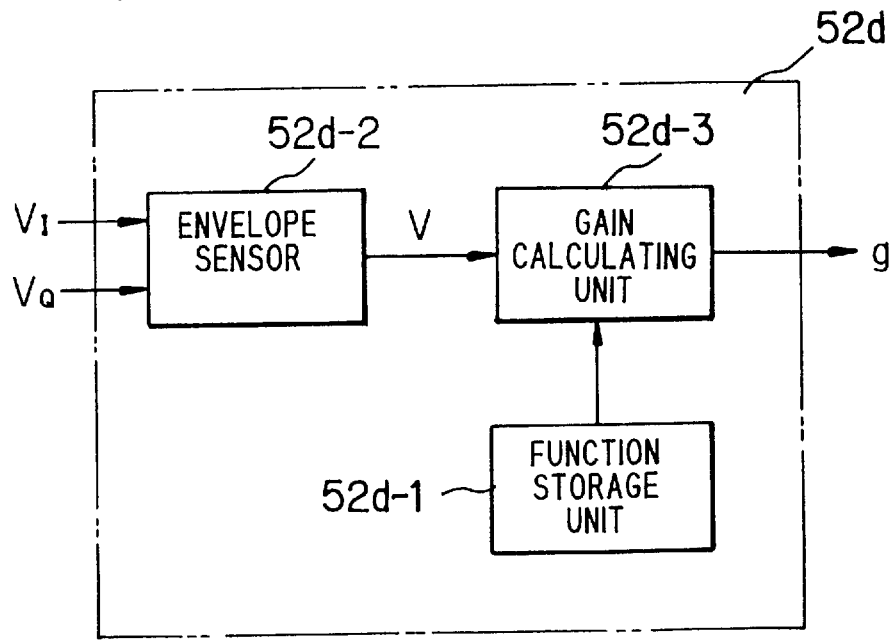
FIG. 8 is a block diagram showing the construction of a function generator.

FIG. 8 illustrates the construction of the function generator 52d. The function generator 52d has a function storage unit 52d-1 in which the corresponding relationship between the envelope value |V| and gain g has been stored in discrete fashion so as to obtain the function shown in FIG. 7, an envelope level sensor 52d-2 for calculating the envelope value |V| in accordance with $$|V| = \sqrt{(V_I^2 + V_Q^2)} \quad \text{or} \quad |V|^2 = V_I^2 + V_Q^2$$

and a gain calculating unit 52d-3 for obtaining the gain g, which conforms to the envelope value |V| calculated by the envelope level sensor 52d-2, from the function that has been stored in the function storage unit 52d-1. The output of the gain calculating unit 52d-3 is the gain g. Since the function has been stored as discrete data, the gain g conforming to the envelope value |V| is calculated by interpolation and input to the multipliers 52e, 52f (FIG. 6).

The multipliers 52e, 52f multiply the I-axis component $V_I$ and Q-axis component $V_Q$ by the gain g and output the products $gV_I$, $gV_Q$, respectively.

Since g·V is determined so as to be equal to or less than the set level $V_{TH}$ in the manner described above, the peak of the code-multiplexed signal is suppressed by the signal-peak suppression unit 52. If $V \leq V_{TH}$ holds, the I-axis component $V_I$ and Q-axis component $V_Q$ are not suppressed and are output substantially as is.

Accordingly, as in the second embodiment, the peak factor can be made small. As a result, it can be so arranged that the maximum power level of the output signal will not exceed the 1 dB compression level even if the output back-off OBO is small. In other words, it can be so arranged that even if the mean power level of the input signal is enlarged, the maximum power level of the output signal will not exceed the 1 dB compression level. This makes it possible to raise the efficiency of the power amplifier and to prevent the occurrence of distortion and broadening of the frequency spectrum. Further, even if maximum output amplitude of the chip shaping filters 53i, 53q is adopted as full scale of the DA converters 54i, 54q, the peak factor is small. As a result, the number of effective bits of a frequently occurring signal in the vicinity of mean power can be enlarged, the noise floor of the output spectrum can be lowered and the number of required bits of the DA converters can be reduced.

The foregoing relates to a case where the gain function indicated by the solid line in FIG. 7 is generated. However, it can be so arranged that a gain function indicated by the dashed line B is generated.

(D) Third embodiment

Figure 9:
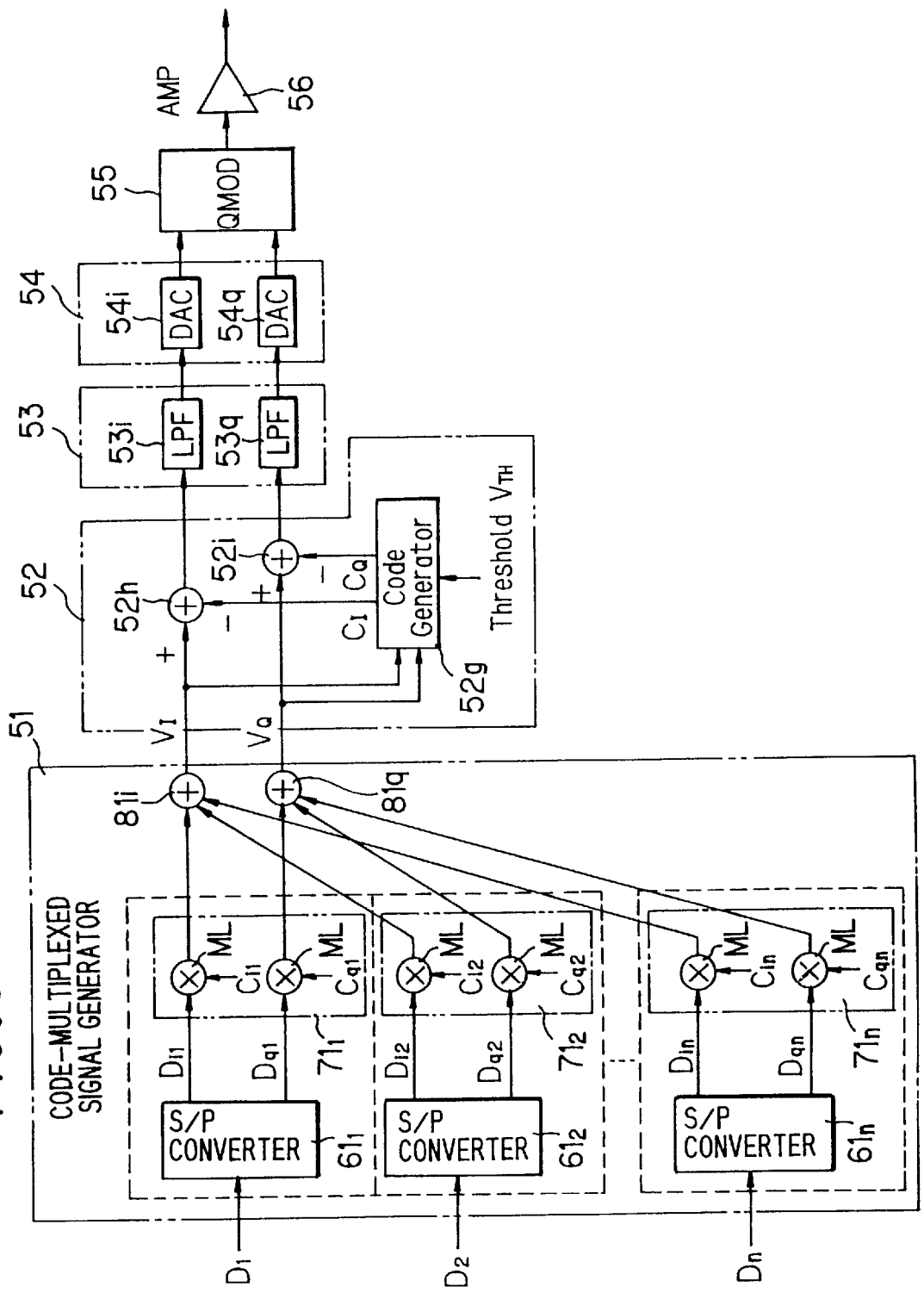
FIG. 9 is a diagram showing the construction of a third embodiment of the invention.

FIG. 9 is a diagram showing the construction of a code multiplexing transmitter according a third embodiment of the invention. Elements identical with those of the first embodiment shown in FIG. 2 are designated by like reference characters. This arrangement differs from that of the first embodiment of FIG. 2 in the construction of the signal-peak suppression unit 52.

The signal-peak suppression unit 52 according to the third embodiment holds the envelope V of the code-multiplexed signal at set level $V_{TH}$ when the envelope attempts to surpass the set level. The signal-peak suppression unit 52 has a code generator 52g for generating codes $C_I$, $C_Q$ conforming to the difference between the envelope value $|V|$ and the set level $V_{TH}$, and arithmetic units 52h, 52i for subtracting the codes $C_I$, $C_Q$ from the I-component code-multiplexed signal $V_I$ and Q-component code-multiplexed signal $V_Q$.

Figure 10:
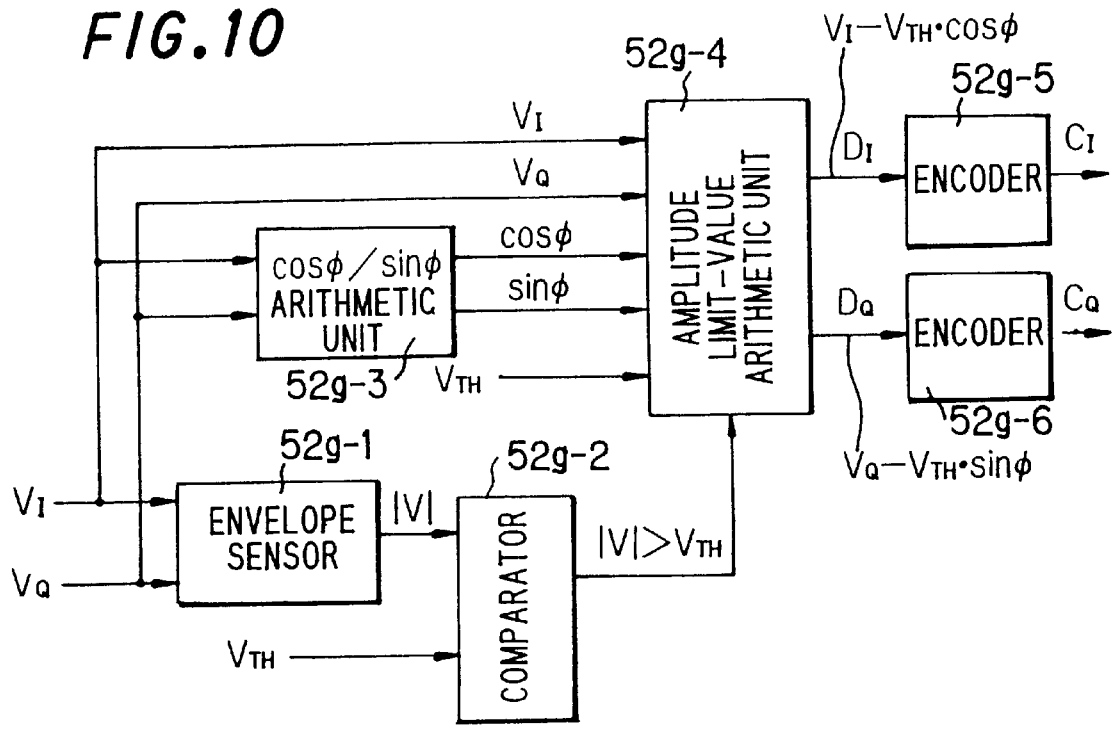
FIG. 10 is a block diagram showing the construction of a code generator.

FIG. 10 illustrates the construction of the code generator 52g. The code generator 52g includes an envelope sensor 52g-1 for sensing a envelope value $|V|$ of the envelope of the code-multiplexed signal obtained by combining the I-component code-multiplexed signal $V_I$ and Q-component code-multiplexed signal $V_Q$, a comparator 52g-2 for comparing the magnitudes of the envelope value $|V|$ and set level $V_{TH}$, a cos$\phi$/sin$\phi$ arithmetic unit 52g-3, an amplitude limit-value arithmetic unit 52g-4 for calculating the difference between the axial components of V and $V_{TH}$ when the envelope value $|V|$ is greater than the set level $V_{TH}$, and coders 52g-5, 52g-6 for generating the codes $C_I$, $C_Q$ of the axial components.

Figure 11:
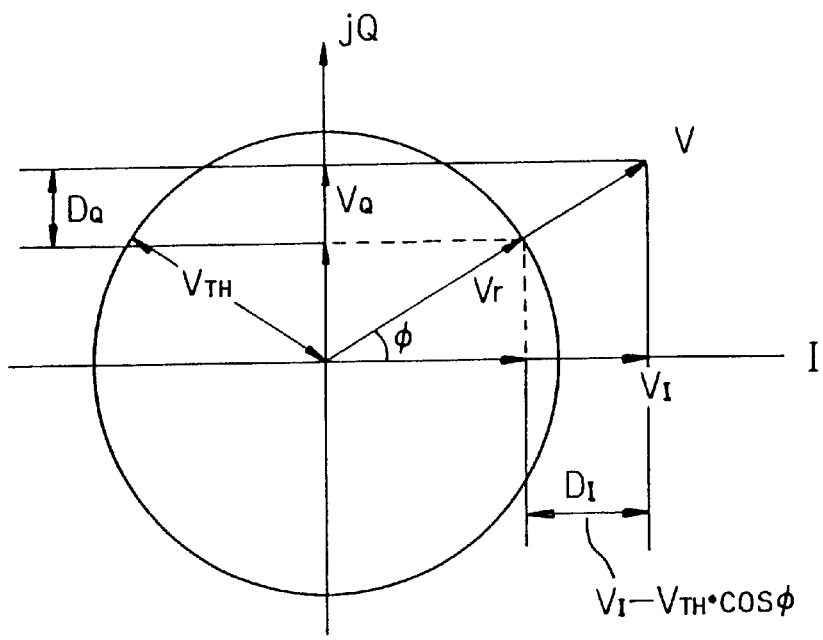
FIG. 11 is a diagram for describing code generation.

Consider an I-Q complex plane shown in FIG. 11. The envelope V of the code-multiplexed signal is a vector in which the component along the I axis is $V_I$ and the component along the Q axis is $V_Q$. Since $V_I$, $V_Q$ are each obtained by summing n-number of spread-spectrum modulated signals (the instantaneous values of which are +1 or −1), these take on values of −n to +n and the envelope V varies, becoming larger and smaller than the set level $V_{TH}$. The envelope sensor 52g-1 calculates the envelope value $|V|$ in accordance with $$|V| = \sqrt{(V_I^2 + V_Q^2)} \text{ or } |V|^2 = V_I^2 + V_Q^2$$

and the comparator 52g-2 compares the magnitudes of the envelope value $|V|$ and the set level $V_{TH}$ and enters the result of the comparison into the amplitude limit-value arithmetic unit 52g-4. The cos$\phi$/sin$\phi$ arithmetic unit 52g-3 calculates cos$\phi$ and sin$\phi$ from $V_I$ and $V_Q$, in which the direction of the vector V is adopted as $\phi$, and inputs cos$\phi$, sin$\phi$ to the amplitude limit-value arithmetic unit 52g-4. The amplitude limit-value arithmetic unit 52g-4 calculates axial components $D_I$, $D_Q$ of the difference vector between the vector V and a vector Vr, which has the same direction as the vector V and has the magnitude $V_{TH}$, in accordance with the following equations:

$$D_I = (|V| - V_{TH})\cos\phi = V_I - V_{TH}\cos\phi$$

$$D_Q = (|V| - V_{TH})\sin\phi = V_Q - V_{TH}\sin\phi$$

and outputs $D_I$, $D_Q$. The coders 52g-5, 52g-6 convert $D_I$, $D_Q$ to the codes $C_I$, $C_Q$ of the same system as $V_I$, $V_Q$ and output the codes $C_I$, $C_Q$. The amplitude limit-value arithmetic unit 52g-4 makes $D_I$, $D_Q$ zero if $|V| \leq V_{TH}$ holds.

The arithmetic unit 52h subtracts $C_I (=D_I)$ from the I-axis component $V_I$ of the code-multiplexed signal and outputs the difference, and the arithmetic unit 52i subtracts $C_Q (=D_Q)$ from the Q-axis component $V_Q$ of the code-multiplexed signal and outputs the difference. As a result, if $|V| > V_{TH}$ holds, then the envelope value becomes equal (is clipped) to $V_{TH}$ so that the peak of the code-multiplexed signal is suppressed. If $V \leq V_{TH}$ holds, the I-axis component $V_I$ and Q-axis component $V_Q$ are not suppressed and are output as is.

Thus, peak factor can be reduced in the same manner as set forth in the first embodiment and effects the same as those of the first embodiment can be obtained.

(E) Review of peak suppression effect according to the invention

In accordance with the present invention, it is possible to achieve peak suppression, without enlarging the spectrum, in the manner described above.

(a) Peak-factor suppression effect

Figure 12:
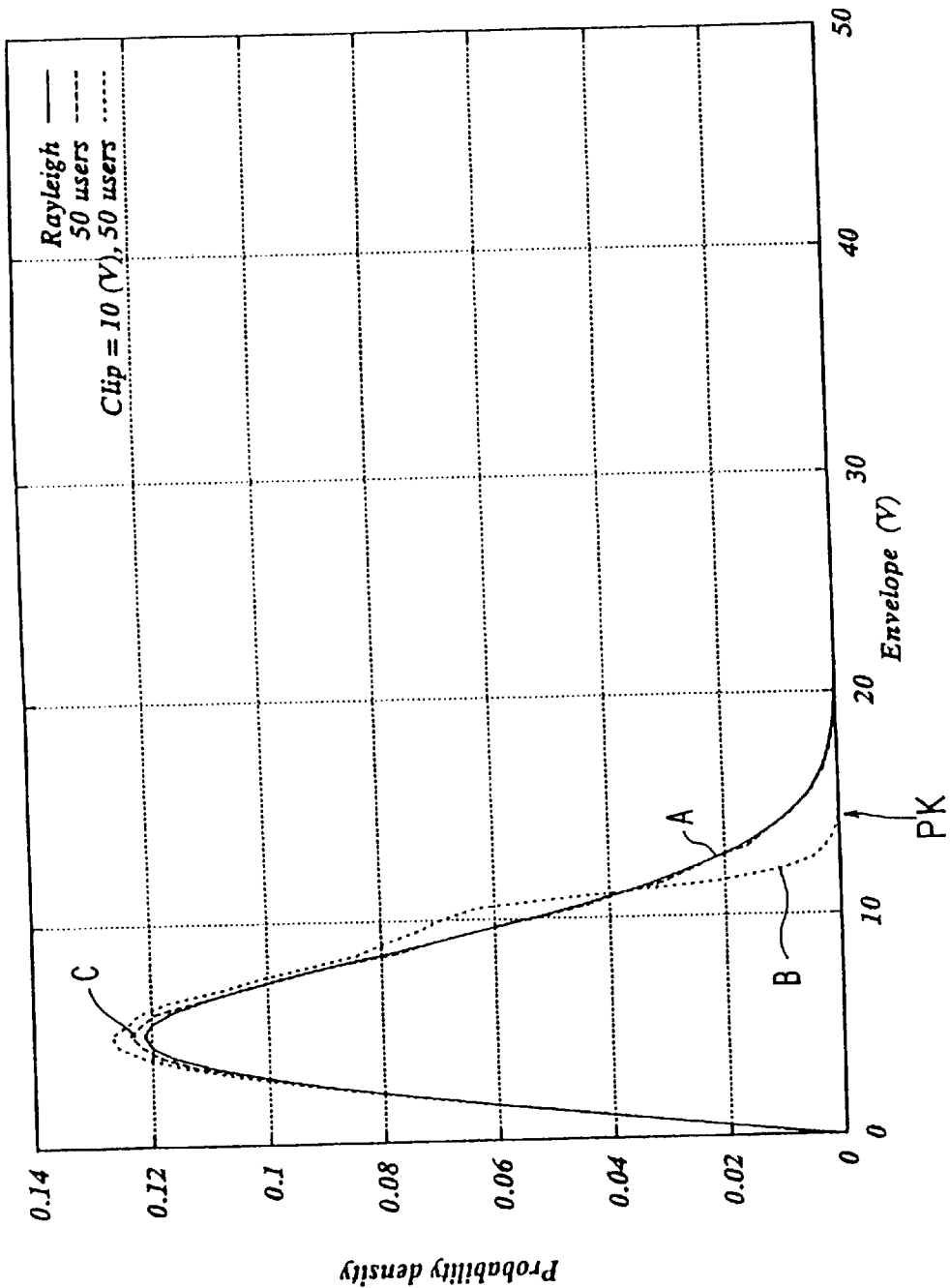
FIG. 12 is a diagram useful in describing the probability density function of the envelope of a 50-user multiplex signal.

FIG. 12 is a diagram useful in describing probability density of the envelope of code-multiplexed signal. FIG. 12 illustrates the probability density function (PDF) of the envelope in a case where 50 codes (50 channels or 50 users) are multiplexed using an orthogonal Gold code having a spreading ratio (PG) of 64 and a code length of 64 chips. Here A represents the logical value of the Rayleigh distribution, B the probability density of the present invention in a case where the set value $V_{TH}$ (hereinafter referred to as the clipping level Vclip) is 10 V, and C is the prior-art probability density in which there is no peak suppression. The clipping level Vclip is indicated with the amplitude (envelope value) of the QPSK signal point, which prevails at the time of one code, being 1.0 V.

It will be understood that the probability density PDF according to the present invention substantially agrees with the Rayleigh distribution and that the peak PK is lowered by peak suppression control. Since the outputs of the chip shaping filters 53i, 53q are employed as the envelope values, the peak value is greater than 10 V owing to the effects of filter response. Before filtering, however, the peak value is the clipping value of 10 V.

Figure 13:
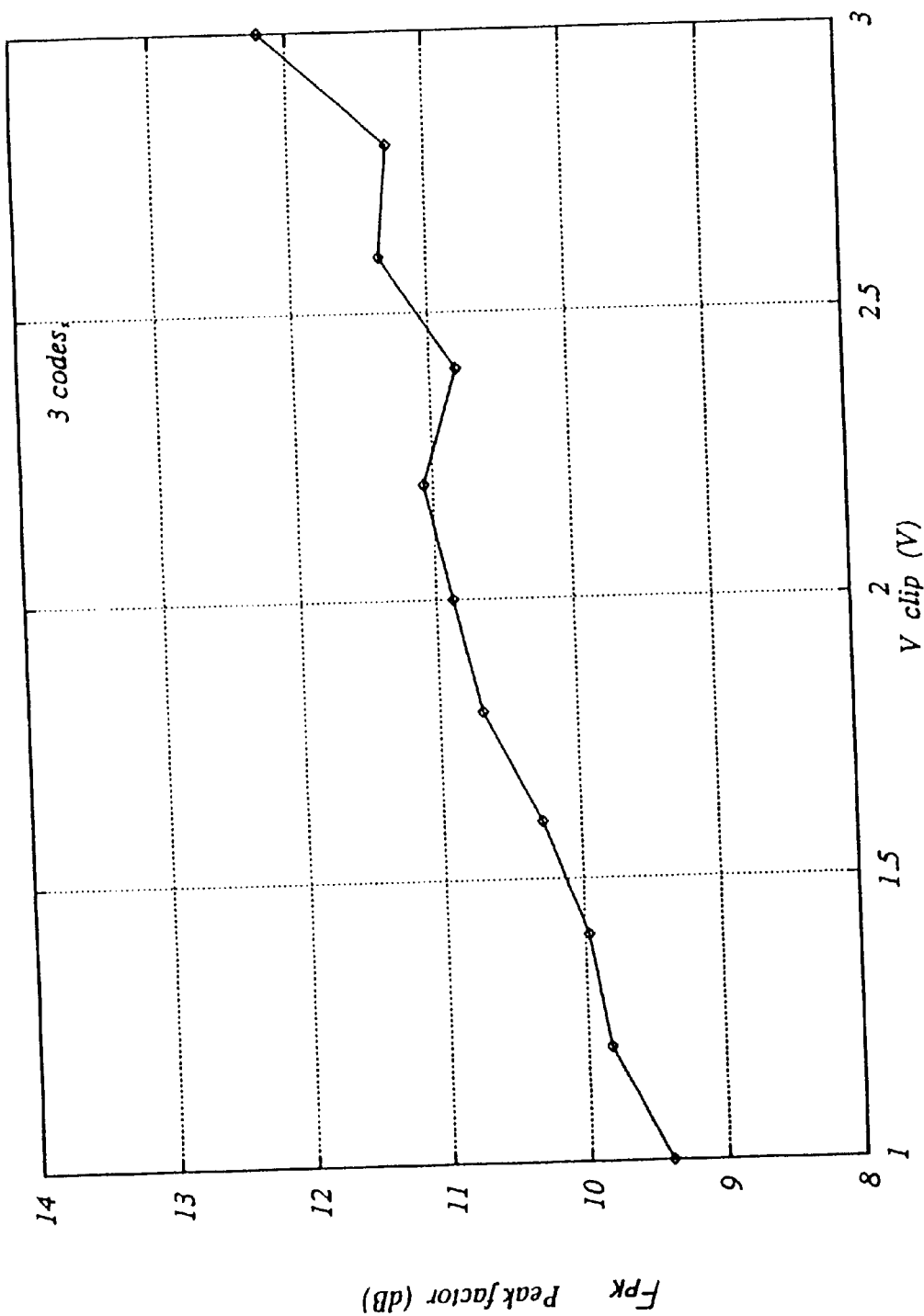
FIG. 13 is a diagram useful in describing the effect of suppressing peak factor according to the present invention.

FIG. 13 is a clipping level vs. peak factor characteristic diagram illustrating the peak-factor suppression effect of the present invention. This is for a case where there are three codes (three channels or three users). The clipping level Vclip is plotted along the horizontal axis and the peak factor FPK along the vertical axis. The graph shows the change in peak factor with respect to clipping level. The amount of reduction in peak factor according to the present invention is 1.1 dB at Vclip=2.5 and 1.3 dB at Vclip=2.0 in comparison with the state in which there is no clipping (clipping level Vclip=3 V). It will thus be understood that the peak factor is reduced.

(b) Improvement in adjacent-channel leakage power characteristic

Figure 14:
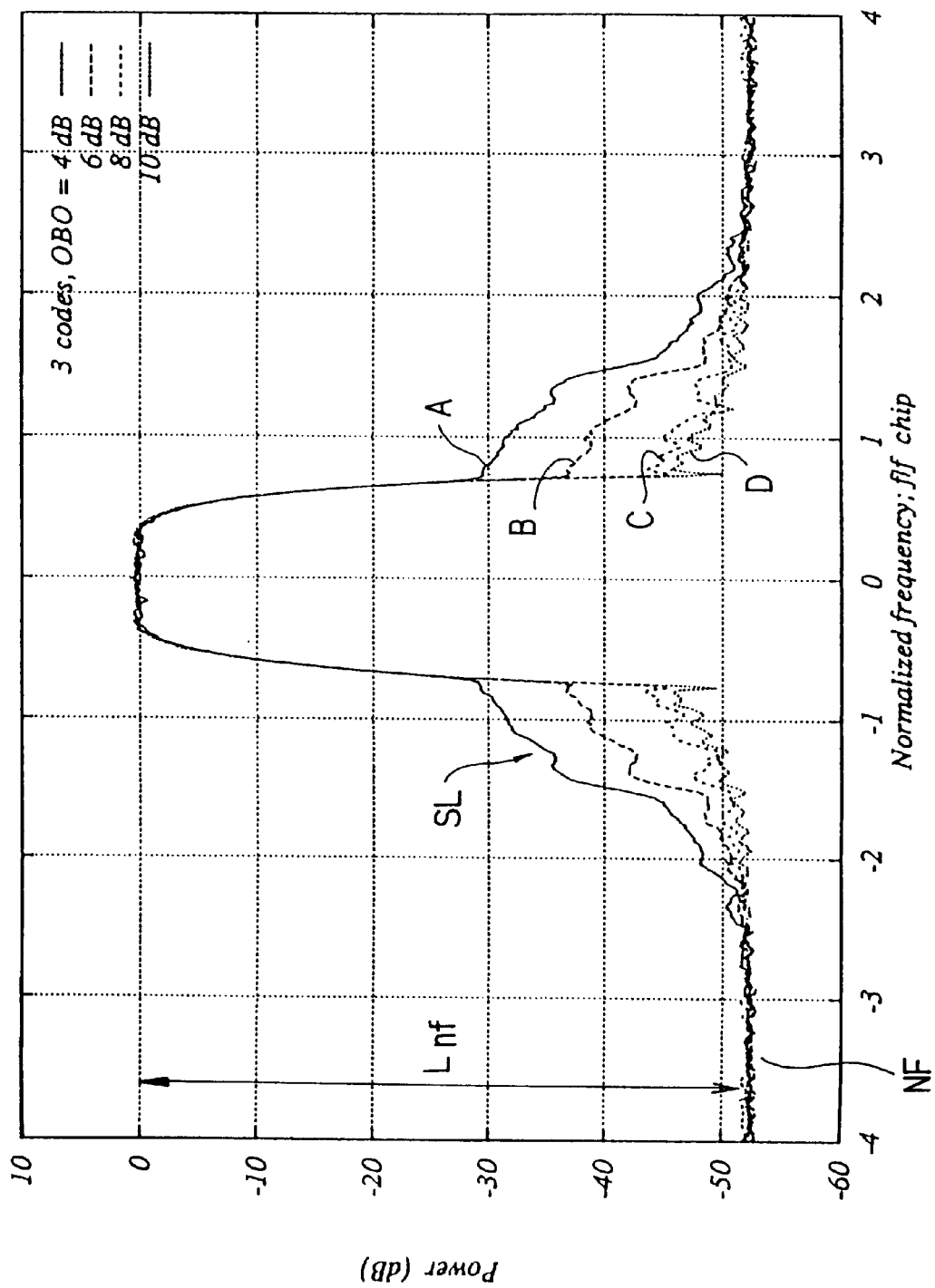
FIG. 14 is a characteristic diagram showing an output power spectrum characteristic when three users are multiplexed.

FIG. 14 is a characteristic diagram showing an output power spectrum characteristic when a code-multiplexed signal is amplified using a non-linear amplifier. The curves A, B, C and D are the result when the output back-off OBO is 4 dB, 6 dB, 8 dB and 10 dB, respectively. The larger the output back-off OBO, the smaller the side lobe SL and the less power leakage there is to the adjacent channel.

FIG. 14 does not illustrate the output power spectrum characteristic in the case where peak is suppressed by the present invention. However, since peak factor can be reduced by peak suppression, it is possible to enlarge the mean power of the input signal and to reduce the output back-off OBO in accordance with the present invention. In other words, it can be so arranged that the maximum power level of the output signal will not surpass the 1 dB compression level even if the output back-off OBO is made small. This makes it possible to raise the efficiency of the power amplifier and to prevent the occurrence of distortion and broadening of the frequency spectrum so as to reduce the leakage of power to the adjacent channel.

In FIG. 14, NF represents the noise floor. If n represents the number of bits constituting the DA converters 54$i$, 54$q$, noise floor level Lnf is given by $20 \cdot \log 2^n$. In accordance with the present invention, peak factor is reduced, thereby making it possible to increase the number of effective bits that express the mean output level in the DA converters. As a result, the noise floor level Lnf is enlarged and leakage of power to the adjacent channel can be reduced.

Figure 15:
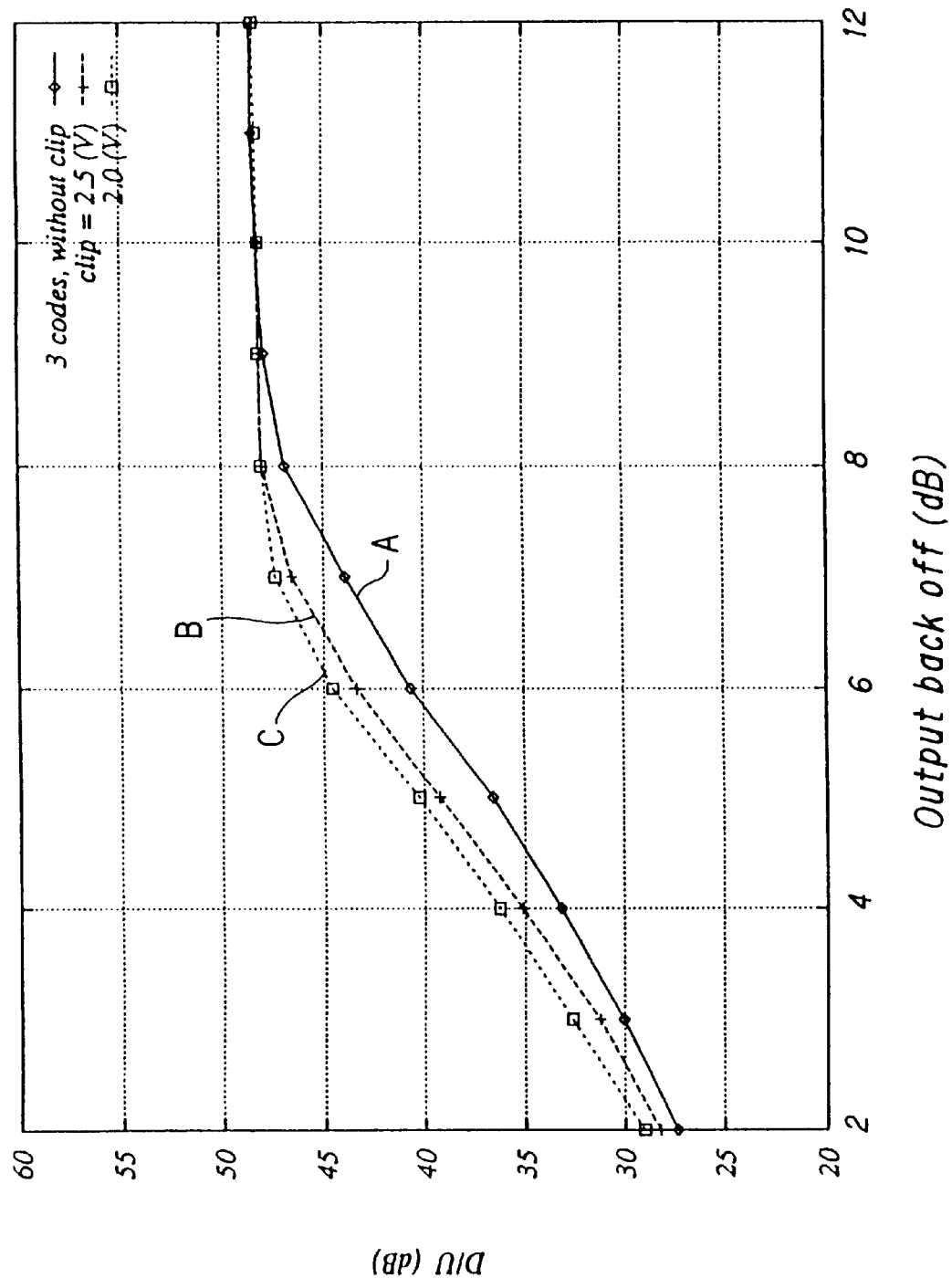
FIG. 15 is a characteristic diagram showing the characteristic of leakage power between adjacent channels when three users are multiplexed.

FIG. 15 is a characteristic diagram showing the characteristic of leakage power between adjacent channels when three codes are multiplexed. Here A represents a curve when there is no clipping (clipping level Vclip=3 V), B a curve when the clipping level Vclip is 2.5 V, and C a curve when clipping level Vclip is 2.0 V. The output back-off OBO is plotted along the horizontal axis and D/U (dB) is plotted along the vertical axis, where D/U is the ratio of main-lobe power (desired power) to power (undesired power) that has leaked into the adjacent channel. The larger the ratio, the better the characteristic. The clipping level Vclip is indicated with the amplitude (envelope value) of the QPSK signal point, which prevails at the time of one code, being 1.0 V. It will be understood from FIG. 15 that the larger the output back-off, the larger D/U becomes, and that the smaller the clipping level Vclip, the larger D/U. If D/U is evaluated as being 45 dB, then making Vclip equal to 2.5 V will make it possible to reduce the output back-off 0.9 dB, namely from 7.4 dB to 6.5 dB. Thus, the efficiency of the power amplifier can be improved correspondingly.

Figure 16:
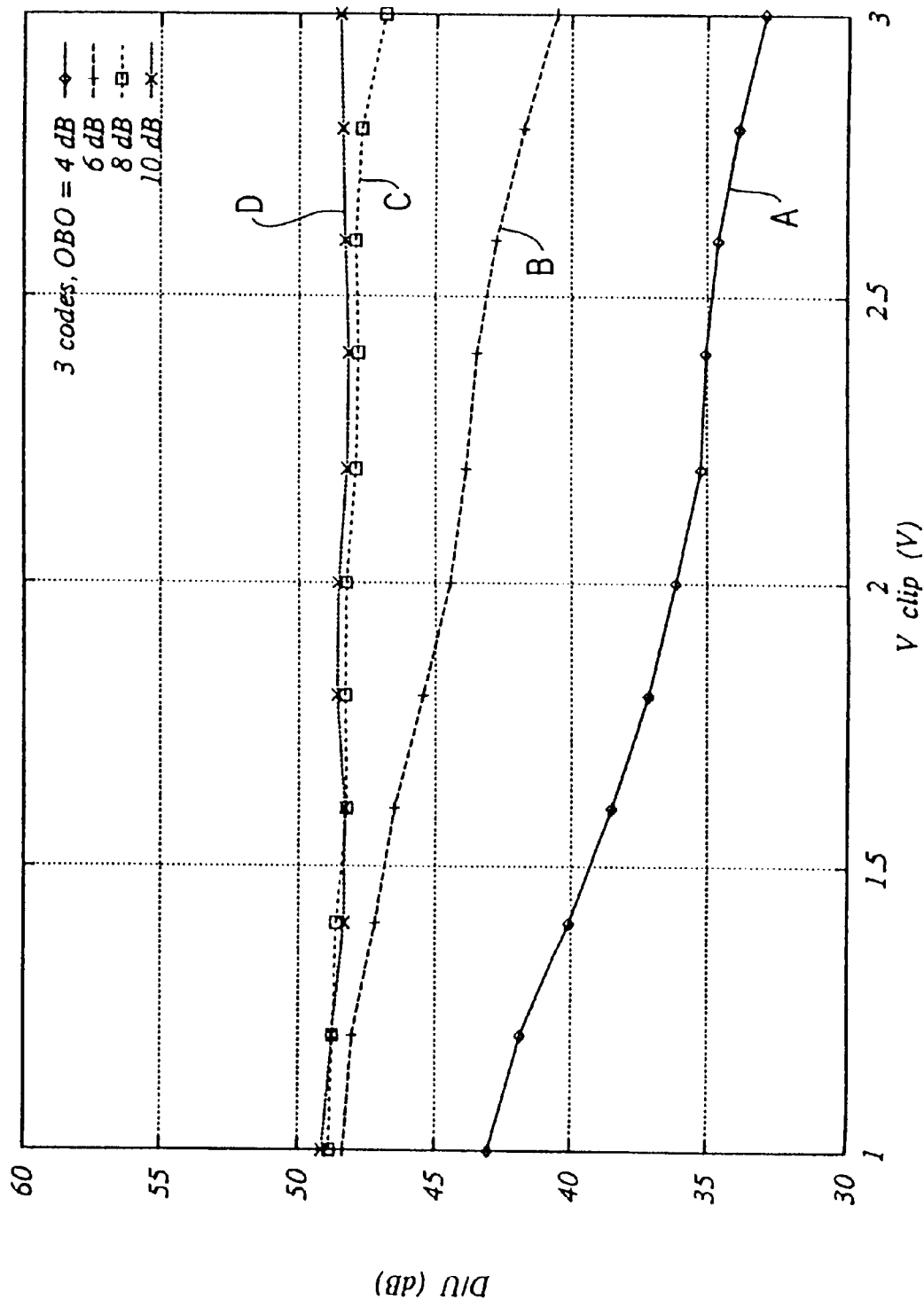
FIG. 16 is a characteristic diagram showing the characteristic of clipping level vs. leakage power between adjacent channels.

FIG. 16 is a characteristic diagram showing the characteristic of clipping level vs. leakage power between adjacent channels. Here the output back-off OBO is adopted as a parameter, the clipping level Vclip is plotted along the horizontal axis and D/U along (dB) along the vertical axis. The curves A, B, C and D are the result when the output back-off OBO is 4 dB, 6 dB, 8 dB and 10 dB, respectively. FIG. 16 illustrates a leakage power characteristic in the same manner as shown in FIG. 15. The clipping level Vclip is the parameter in FIG. 15 and the output back-off OBO is the parameter in FIG. 16. It will be understood from the characteristic that the larger the output back-off OBO, the larger D/U and that the smaller the clipping level Vclip, the larger D/U. For example, in a case where the output back-off is 6 dB, D/U can be improved by 3 dB if Vclip is changed from 3.0 V (no clipping) to 2.5 V.

(c) Modulation accuracy characteristic

Though a decline in modulation accuracy and a deterioration in the error rate characteristic due to peak suppression might be expected, in actuality these problems do no arise, as will be illustrated below.

Figure 17:
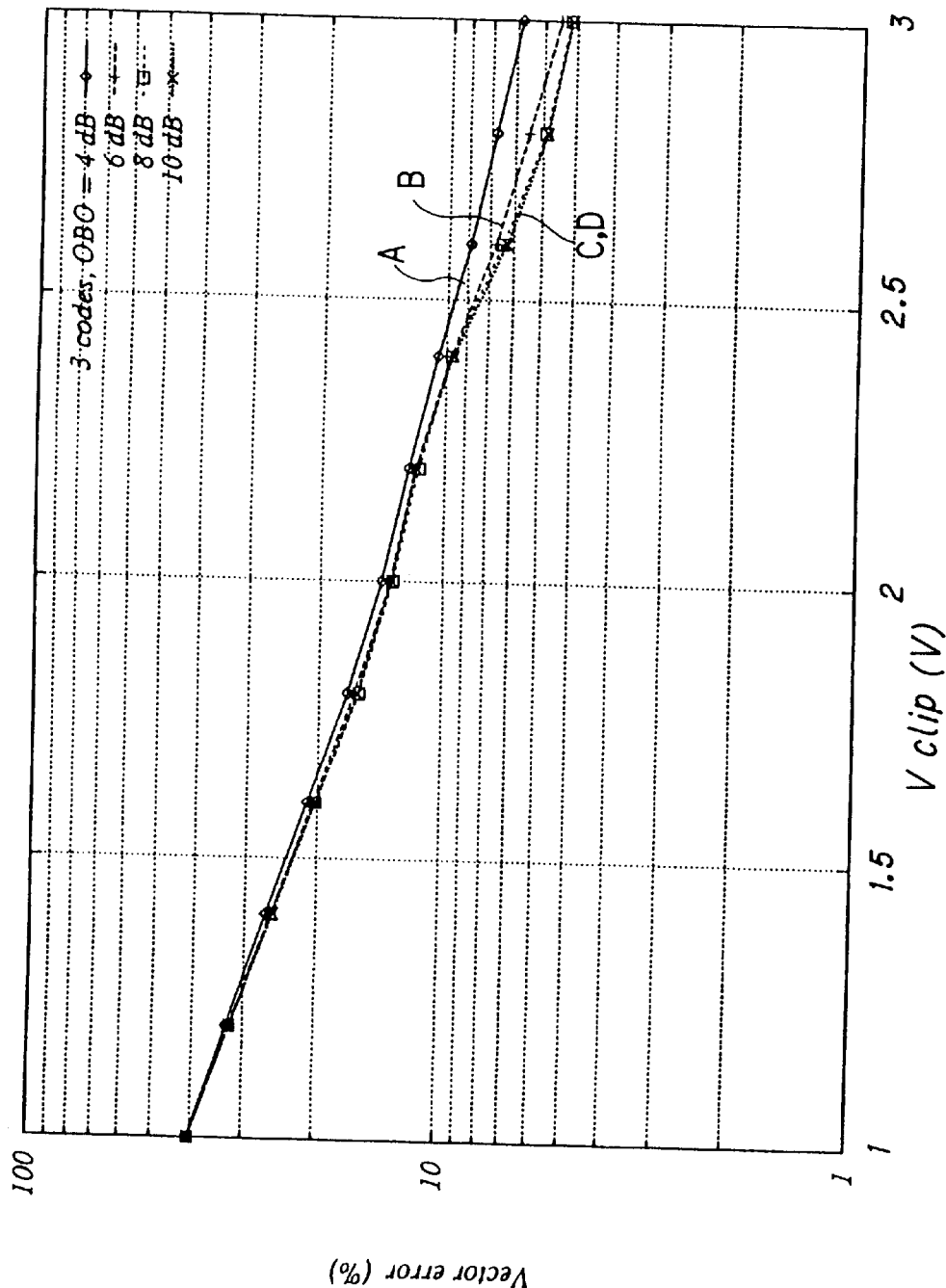
FIG. 17 is a characteristic diagram showing the characteristic of clipping level vs. modulation accuracy.
Figure 18:
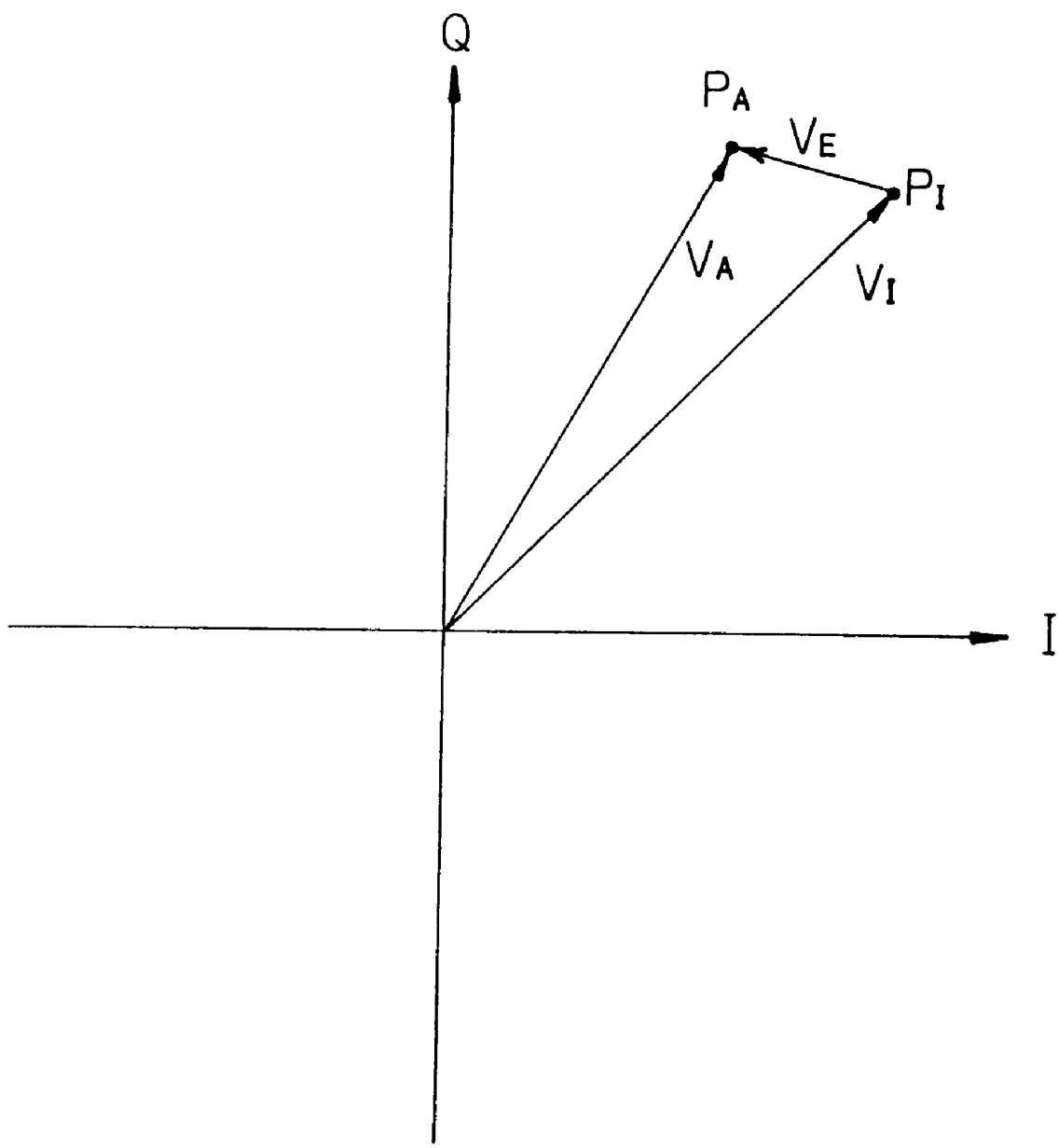
FIG. 18 is a diagram useful in describing modulation accuracy.

FIG. 17 is a characteristic diagram showing the characteristic of clipping level vs. modulation accuracy in a situation where three codes are multiplexed. The curves A, B, C and D are the result when the output back-off OBO is 4 dB, 6 dB, 8 dB and 10 dB, respectively. Modulation accuracy is defined as the mean root square of vector error VE from an ideal reception-signal point PI to an actual reception-signal point PA, as shown in FIG. 18. More specifically, if we let $V_{Ei}$ (i=1~N) represent the vector error obtained by N measurements, modulation accuracy η will be given by the following equation:

$$\eta = \left( \sqrt{\Sigma |V_{Ei}|^2} \right) \times 100 / N (\%)$$

In a case where a modulation accuracy of 10% is allowed, clipping up to Vclip=2.5 V is possible. With regard to non-linear distortion of the amplifier, deterioration on the order of a maximum of 2% occurs at an output back-off OBO of 4 dB if the Vclip is made 2.5 V. The reason why modulation accuracy does not become less than 5% in the absence of clipping (Vclip=3.0 V) at OBO=4 dB is that the characteristic of the FIR filter used in chip shaping in this study is not the ideal route roll-off characteristic because of the finite tap length.

Thus, modulation accuracy deteriorates owing to peak suppression. However, if a modulation accuracy of 10% is allowed, clipping of up to 2.5 V is possible in case of three-code multiplexing, peak can be suppressed and the above-described effects can be obtained owing to peak suppression.

(d) Error rate characteristic

Figure 19:
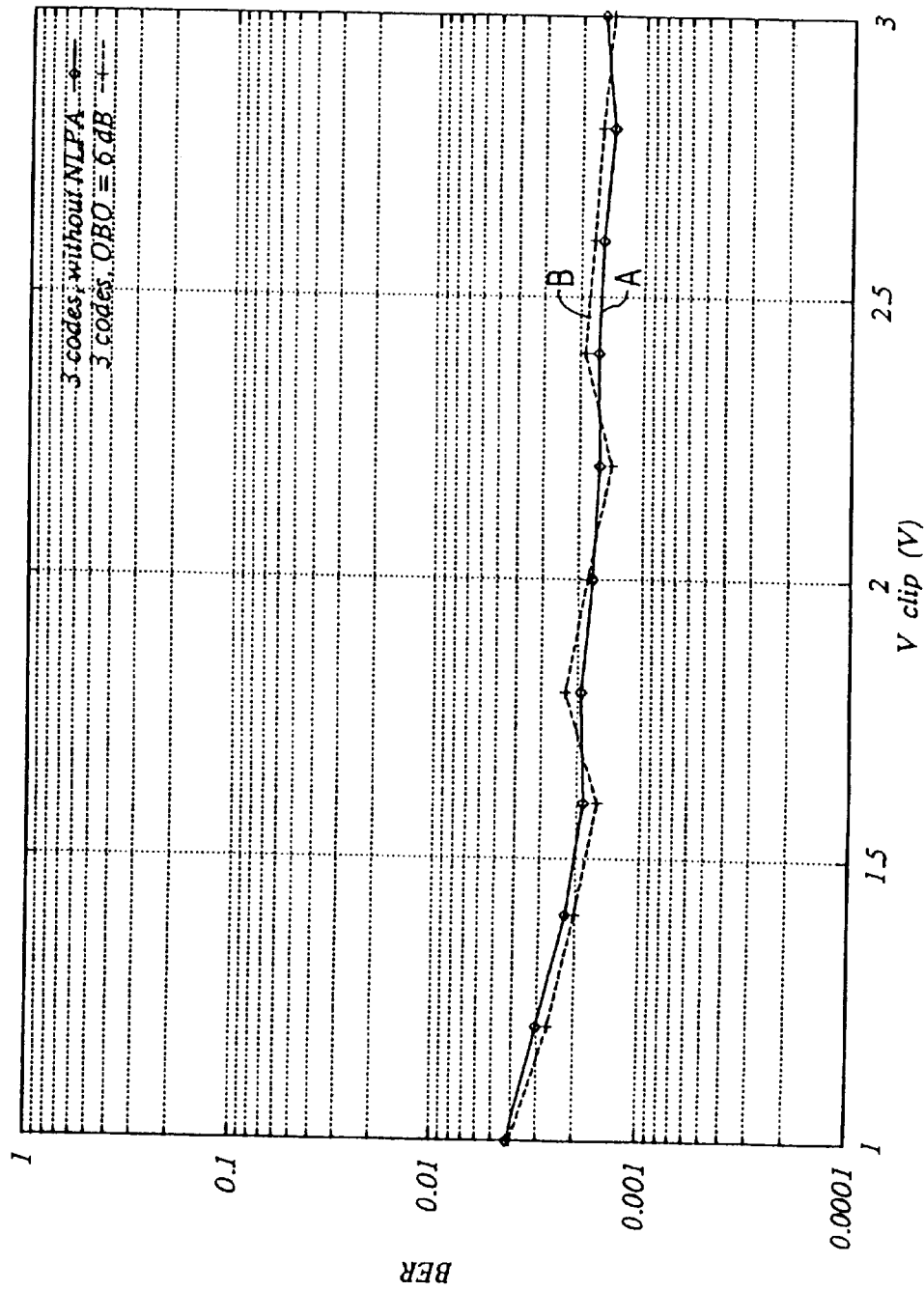
FIG. 19 is a characteristic diagram showing the characteristic of clipping level vs. bit error rate.
Figure 20:
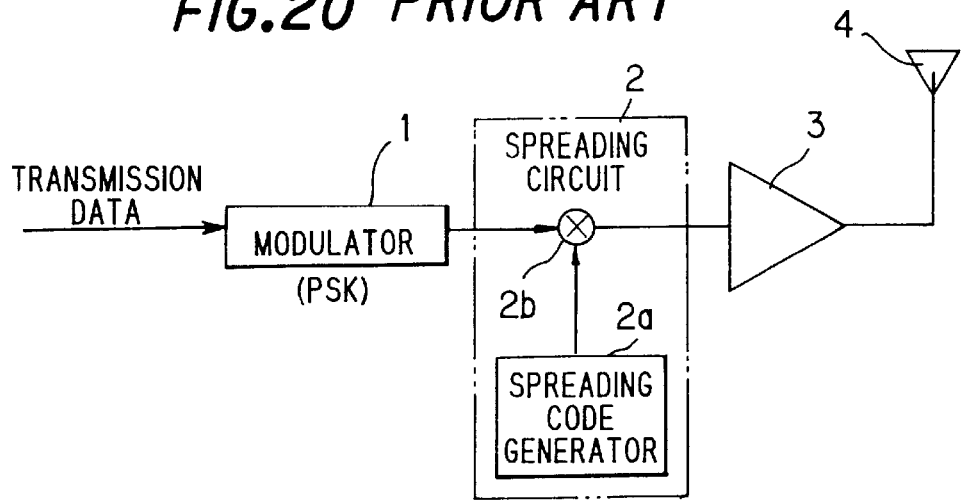
FIG. 20 is a diagram for describing the principle of a transmitter.
Figure 21:
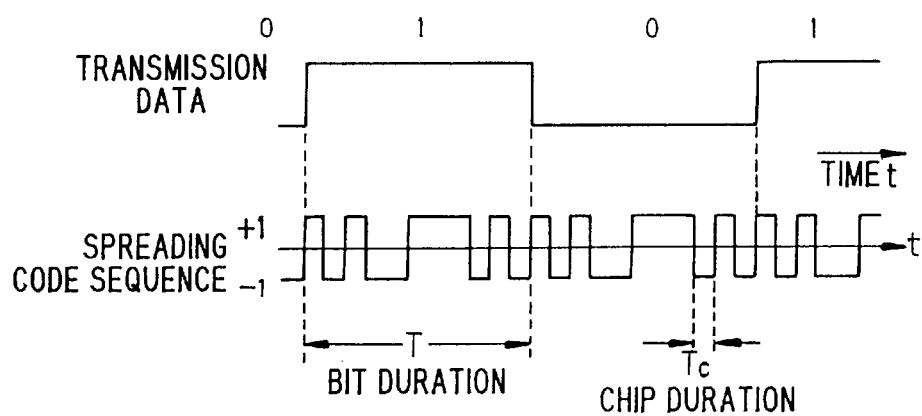
FIG. 21 is a diagram useful in describing the temporal waveforms of transmission data and a spreading code sequence such as pseudorandom noise.
Figure 22:
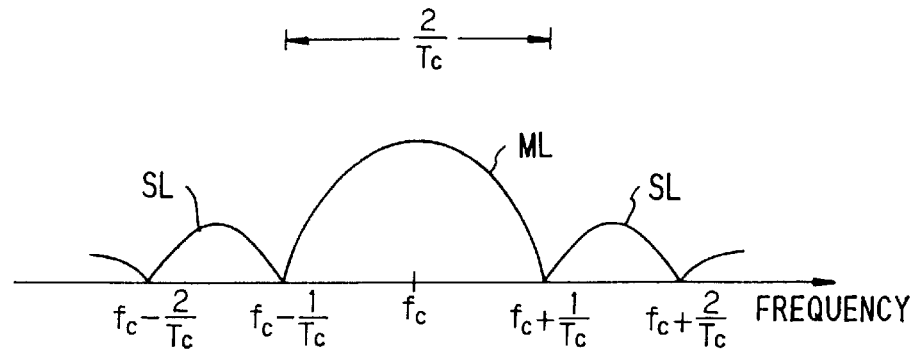
FIG. 22 is a diagram useful in describing the spectrum distribution of a spread-spectrum modulated signal.
Figure 23:
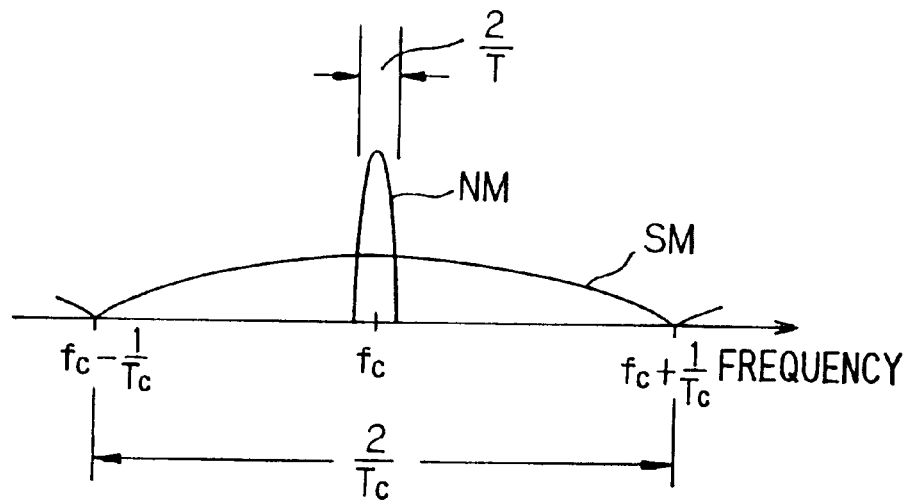
FIG. 23 is a diagram for describing spreading ratio.
Figure 24:
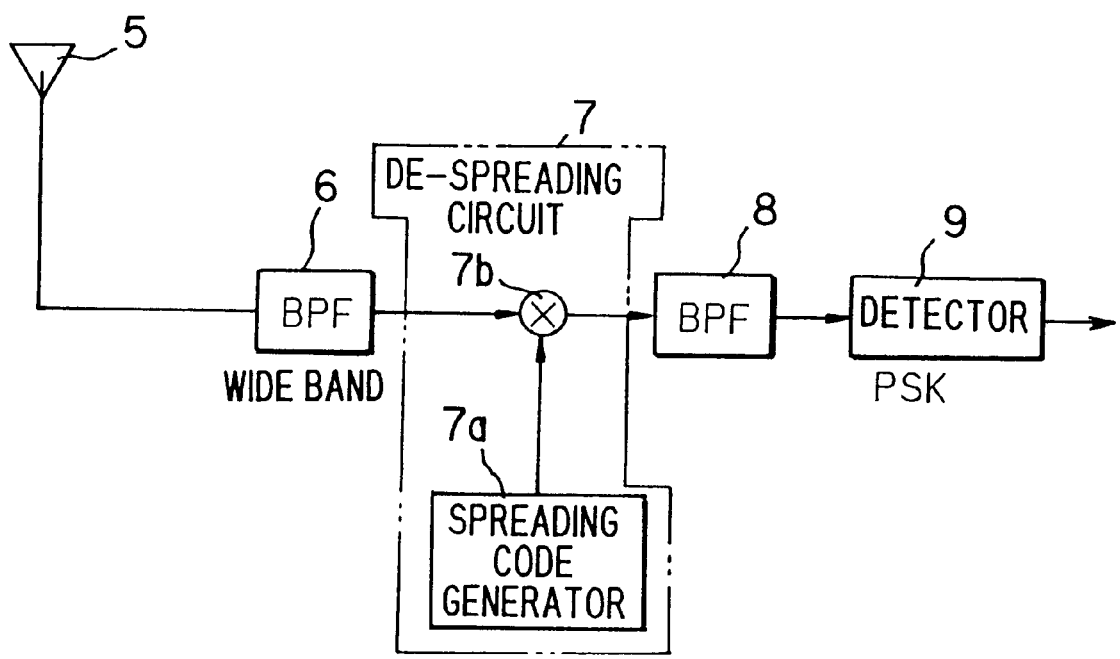
FIG. 24 is a diagram showing the principle of a receiver.
Figure 25:
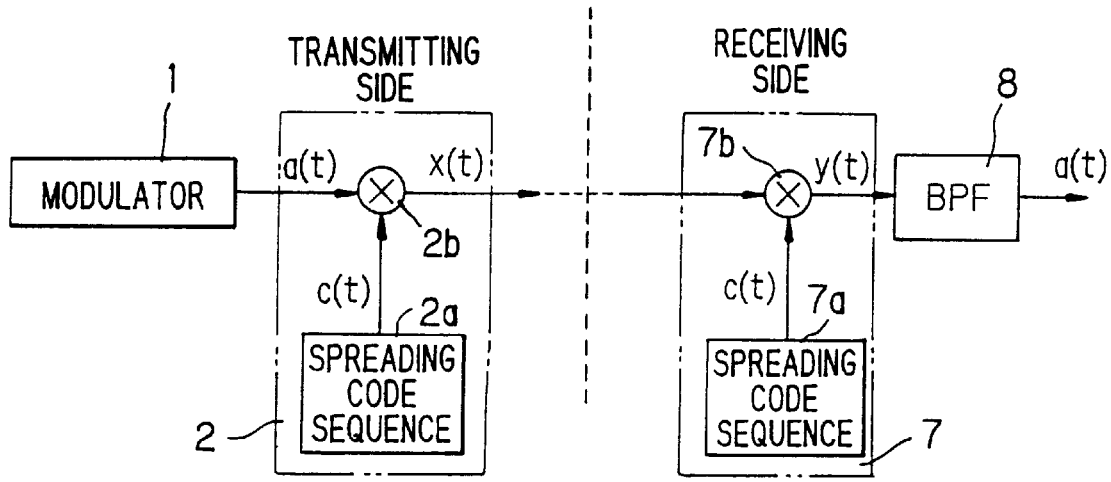
FIG. 25 is a diagram for describing de-spreading.
Figure 26:
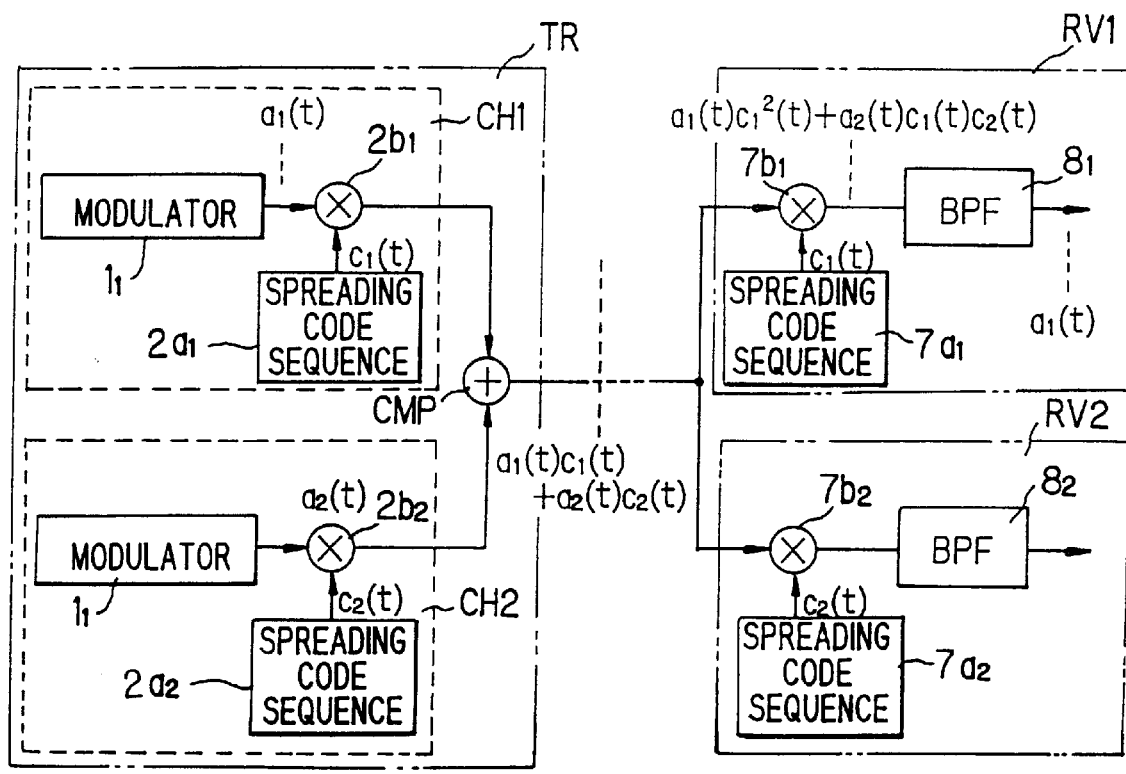
FIG. 26 is a diagram for describing the principle of CDMA.

FIG. 19 is a characteristic diagram showing the characteristic of clipping level vs. bit error rate. Here the clipping level Vclip is plotted along the horizontal axis and bit error rate BER is plotted along the vertical axis. The characteristic of FIG. 19 is evaluated at $E_b/N_0$=6.8 dB, which gives BER=$10^{-3}$ in the static characteristic of absolute synchronous detection, where $E_b$ represents the energy of one bit of information before spreading, $N_0$ represents the thermal noise per Hertz and $E_b/N_0$ is equivalent to the S/N ratio. Further, A represents the characteristic of an ideal linear amplifier and B the characteristic in a case where the output back-off OBO is 6 dB.

It will be understood from FIG. 19 that a large deterioration in the error rate characteristic does not appear up to a Vclip value of 1.5 V in a case where the spreading ratio PG is 16 and three codes are multiplexed. The reason for this is believed to be that correcting for the decline in mean power due to clipping increases the transmission power per code to compensate for deterioration caused by interference. In other words, since the level of the input code is controlled so as to render the mean power constant, the power of other chips is enlarged to the extent that the peak of prescribed chips of the code-multiplexed signal is suppressed. Though the accuracy of a chip that has undergone peak suppression deteriorates, it is believed that the accuracy of other chips is improved, thereby offsetting the deterioration in accuracy so that there is no worsening of error rate.

A case has been described in which the present invention is applied to a code multiplexing transmitter. However, the invention is applicable also to a base station that handles a plurality of channels in mobile wireless communications, to a mobile station in which a high transmission rate is achieved using a plurality of channels and to other wireless communications apparatus.

Thus, in accordance with the present invention, it is so arranged that peak factor is reduced by suppressing the peak of a code-multiplexed signal. As a result, it can be so arranged that the maximum power level of the output signal will not surpass the 1 dB threshold level even if the output back-off OBO is small. The efficiency of the power amplifier can be raised and it is possible to prevent the occurrence of distortion and broadening of the frequency spectrum. More specifically, in accordance with the present invention, peak factor is reduced by suppressing the peak of the code-multiplexed signal. As a result, it is possible to reduce output back-off of the power amplifier for obtaining a prescribed adjacent-channel leakage power characteristic, and the efficiency of the power amplifier can be improved.

Further, in accordance with the present invention, the peak of the code-multiplexed signal is suppressed so as to reduce the peak factor. As a result, it is possible to make effective use of the number of quantization bits of D/A converters, lower the noise floor of the output spectrum and reduce the number of required bits in the D/A converters.

As many apparently widely different embodiments of the present invention can be made without departing from the spirit and scope thereof, it is to be understood that the invention is not limited to the specific embodiments thereof except as defined in the appended claims.

What is claimed is:

1. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a signal-peak suppressing unit for holding an envelope of the code-multiplexed signal below a set level; and a power amplifier for amplifying the code-multiplexed signal output from the signal-peak suppressing unit and transmitting the amplified code-multiplexed signal from an antenna;

wherein said signal-peak suppressing unit includes:

means for sensing the envelope of the code-multiplexed signal;

means for comparing an envelope value of the envelope with the set level and obtaining a damping factor which brings the envelope value to the set level if the envelope value exceeds the set level; and means for multiplying the code-multiplexed signal by the damping factor and outputting the result.

2. The apparatus according to claim 1, wherein said set level is determined based upon the character of said power amplifier.

3. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a signal-peak suppressing unit for holding an envelope of the code-multiplexed signal below a set level; and a power amplifier for amplifying the code-multiplexed signal output from the signal-peak suppressing unit and transmitting the amplified code-multiplexed signal from an antenna;

wherein said signal-peak suppressing unit includes:

means for storing a function in which a envelope value of the envelope of the code-multiplexed signal is a variable;

means for sensing the envelope of the code-multiplexed signal; and means for multiplying the code-multiplexed signal by a value of the function that conforms to the envelope value of the sensed envelope.

4. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a signal-peak suppressing unit for holding an envelope of the code-multiplexed signal below a set level; and a power amplifier for amplifying the code-multiplexed signal output from the signal-peak suppressing unit and transmitting the amplified code-multiplexed signal from an antenna;

wherein said signal-peak suppressing unit includes:

means for sensing the envelope of the code-multiplexed signal;

means for generating a code conforming to the difference between the envelope value and the set level; and means for suppressing peak value of the code-multiplexed signal by adding the code to or subtracting it from the code-multiplexed signal.

5. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a filter for limiting bandwidth of the code-multiplexed signal;

a DA converter for converting a digital output of said filter to an analog signal;

a modulator for applying modulation to the analog signal output of said DA converter;

a power amplifier for amplifying an output of said modulator and transmitting the amplified signal from an antenna; and a signal-peak suppressing unit provided between said code-multiplexed signal generator and said filter for holding an envelope of the code-multiplexed signal below a set level;

wherein said signal-peak suppressing unit includes:

means for sensing the envelope of the code-multiplexed signal;

means for comparing an envelope value of the envelope with the set level and obtaining a damping factor which brings the envelope value to the set level if the envelope value exceeds the set level; and means for multiplying the code-multiplexed signal by the damping factor and outputting the result.

6. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a filter for limiting bandwidth of the code-multiplexed signal;

a DA converter for converting a digital output of said filter to an analog signal;

a modulator for applying modulation to the analog signal output of said DA converter;

a power amplifier for amplifying an output of said modulator and transmitting the amplified signal from an antenna; and a signal-peak suppressing unit provided between said code-multiplexed signal generator and said filter for holding an envelope of the code-multiplexed signal below a set level, wherein said code-multiplexed signal generator includes:

converting means for alternately distributing, one bit at a time, each of the transmission data to thereby convert the data to in-phase component data and quadrature component data respectively;

spread-spectrum modulators for multiplying the data of the in-phase component and the data of the quadrature component by spreading code sequences; and combining units for combining the spread-spectrum modulated signals of the in-phase component output by each of the spread-spectrum modulators so as to generate a code-multiplexed signal $V_I$ of the in-phase component, combining the spread-spectrum modulated signals of the quadrature component output by each of the spread-spectrum modulators so as to generate a code-multiplexed signal $V_Q$ of the quadrature component and respectively outputting the code-multiplexed signals $V_I$, $V_Q$ of the in-phase and quadrature components;

said signal-peak compressing unit including:

means for sensing an envelope of a resultant code-multiplexed signal obtained by combining the code-multiplexed signals $V_I$, $V_Q$ of the in-phase and quadrature components;

means for comparing an envelope value of the envelope and the set level and obtaining a damping factor which brings the envelope value to the set level if the envelope value exceeds the set level; and means for multiplying the code-multiplexed signals $V_I$, $V_Q$ of the in-phase and quadrature components by the damping factor; and said modulator comprising a quadrature phase-shift keying modulator.

7. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a filter for limiting bandwidth of the code-multiplexed signal;

a DA converter for converting a digital output of said filter to an analog signal;

a modulator for applying modulation to the analog signal output of said DA converter;

a power amplifier for amplifying an output of said modulator and transmitting the amplified signal from an antenna; and a signal-peak suppressing unit provided between said code-multiplexed signal generator and said filter for holding an envelope of the code-multiplexed signal below a set level, wherein said code-multiplexed signal generator includes:

converting means for alternately distributing, one bit at a time, each of the transmission data to thereby convert the data to in-phase component data and quadrature component data respectively;

spread-spectrum modulators for multiplying the data of the in-phase component and the data of the quadrature component by spreading code sequences; and combining units for combining the spread-spectrum modulated signals of the in-phase component output by each of the spread-spectrum modulators so as to generate a code-multiplexed signal $V_I$ of the in-phase component, combining the spread-spectrum modulated signals of the quadrature component output by each of the spread-spectrum modulators so as to generate a code-multiplexed signal $V_Q$ of the quadrature component and respectively outputting the code-multiplexed signals $V_I$, $V_Q$ of the in-phase and quadrature components;

said signal-peak compressing unit including:

means for storing a function in which a envelope value of the envelope of the code-multiplexed signal is a variable;

means for sensing an envelope of a resultant code-multiplexed signal obtained by combining the code-multiplexed signals $V_I$, $V_Q$ of the in-phase and quadrature components; and means for multiplying the code-multiplexed signals $V_I$, $V_Q$ of the in-phase and quadrature components by a value of the function that conforms to the envelope value of the sensed envelope;

said modulator comprising a quadrature phase-shift keying modulator.

8. A code multiplexing wireless apparatus for generating a code-multiplexed signal, amplifying the code-multiplexed signal and transmitting the amplified signal, comprising:

a code-multiplexed signal generator for spread-spectrum modulating by multiplying each of transmission data by a spreading code and combining spread-spectrum modulated signals to generate a code-multiplexed signal;

a filter for limiting bandwidth of the code-multiplexed signal;

a DA converter for converting a digital output of said filter to an analog signal;

a modulator for applying modulation to the analog signal output of said DA converter;

a power amplifier for amplifying an output of said modulator and transmitting the amplified signal from an antenna; and a signal-peak suppressing unit provided between said code-multiplexed signal generator and said filter for holding an envelope of the code-multiplexed signal below a set level, wherein said code-multiplexed signal generator includes:

converting means for alternately distributing, one bit at a time, each of the transmission data to thereby convert the data to in-phase component data and quadrature component data respectively;

spread-spectrum modulators for multiplying the data of the in-phase component and the data of the quadrature component by spreading code sequences; and combining units for combining the spread-spectrum modulated signals of the in-phase component output by each of the spread-spectrum modulators so as to generate a code-multiplexed signal $V_I$ of the in-phase component, combining the spread-spectrum modulated signals of the quadrature component output by each of the spread-spectrum modulators so as to generate a code-multiplexed signal $V_Q$ of the quadrature component and respectively outputting the code-multiplexed signals $V_I$, $V_Q$ of the in-phase and quadrature components;

said signal-peak compressing unit including:

means for sensing an envelope of a resultant code-multiplexed signal obtained by combining the code-multiplexed signals $V_I$, $V_Q$ of the in-phase and quadrature components;

means for generating codes $C_I$, $C_Q$ conforming to in-phase and quadrature components, which are differences between the sensed envelope value and the set level; and means for suppressing peak value of the code-multiplexed signal by adding the codes $C_I$, $C_Q$ of the in-phase and quadrature components to or subtracting the codes $C_I$, $C_Q$ from the code-multiplexed signals $V_I$, $V_Q$ of the in-phase and quadrature components;

said modulator comprising a quadrature phase-shift keying modulator.

9. The apparatus according to claim 5, wherein maximum amplitude of the output of said filter is adopted as full scale of said DA converter.

* * * * *